(12) United States Patent
Kuwahara et al.

(10) Patent No.: US 10,877,583 B2
(45) Date of Patent: Dec. 29, 2020

(54) GAME APPARATUS AND INFORMATION PROCESSING APPARATUS

(71) Applicants: Masato Kuwahara, Kyoto (JP); Tetsuya Akama, Kyoto (JP); Kochi Kawai, Kyoto (JP); Kazuhiko Koriyama, Kyoto (JP); Hitoshi Tsuchiya, Kyoto (JP)

(72) Inventors: Masato Kuwahara, Kyoto (JP); Tetsuya Akama, Kyoto (JP); Kochi Kawai, Kyoto (JP); Kazuhiko Koriyama, Kyoto (JP); Hitoshi Tsuchiya, Kyoto (JP)

( * ) Notice: Subject to any disclaimer, the term of this patent is extended or adjusted under 35 U.S.C. 154(b) by 55 days.

(21) Appl. No.: 14/734,472

(22) Filed: Jun. 9, 2015

(65) Prior Publication Data

US 2015/0355768 A1    Dec. 10, 2015

(30) Foreign Application Priority Data

Jun. 9, 2014    (JP) .................................. 2014-119097

(51) Int. Cl.
*G06F 3/041*        (2006.01)
*G06F 3/02*         (2006.01)
(Continued)

(52) U.S. Cl.
CPC ........ *G06F 3/0412* (2013.01); *A63F 13/2145* (2014.09); *A63F 13/24* (2014.09);
(Continued)

(58) Field of Classification Search
CPC ...... G06F 3/0412; G06F 3/0227; G06F 3/044; G06F 3/045; G06F 1/1626; G06F 1/1632;
(Continued)

(56) References Cited

U.S. PATENT DOCUMENTS 5,572,239 A     11/1996  Jaeger
2002/0155890 A1*  10/2002  Ha ......................... A63F 13/06
                                                463/36

(Continued)

FOREIGN PATENT DOCUMENTS

JP     2002-5678         1/2002
JP     2003-151399 A     5/2003
(Continued)

OTHER PUBLICATIONS

Office Action dated Dec. 9, 2016, issued in corresponding EP Application No. 15 171 133.0 (6 pages).
(Continued)

*Primary Examiner* — Richard J Hong
(74) *Attorney, Agent, or Firm* — Nixon & Vanderhye P.C.

(57) ABSTRACT

A non-limiting example information processing apparatus comprises a housing, and a first portion of the housing is formed in an elliptical form when viewing from the front. A display panel and a touch panel constitute one main surface of the first portion. Holes are formed in left and right end portions of the display panel and the touch panel, and two operation sticks are provided through the two holes. When viewing the first portion from the front, an area except key tops of the operation sticks becomes a display area.

48 Claims, 23 Drawing Sheets

(51) Int. Cl.
*A63F 13/24* (2014.01)
*G06F 3/044* (2006.01)
*G06F 3/045* (2006.01)
*G06F 3/0354* (2013.01)
*A63F 13/537* (2014.01)
*A63F 13/2145* (2014.01)

(52) U.S. Cl.
CPC .......... *A63F 13/537* (2014.09); *G06F 3/0227* (2013.01); *G06F 3/03549* (2013.01); *G06F 3/041* (2013.01); *G06F 3/044* (2013.01); *G06F 3/045* (2013.01)

(58) Field of Classification Search
CPC .... G06F 3/04845; G06F 3/0416; G06F 3/011; G06F 3/013; G06F 3/04815; G06F 3/04883; G06F 3/0488; G06F 3/0489; G06F 3/041; G06F 3/03549; A63F 13/24; A63F 13/06; A63F 13/87; A63F 13/537; A63F 13/2145; B60K 37/06; G09G 3/3677; G02B 27/017
See application file for complete search history.

(56) References Cited

U.S. PATENT DOCUMENTS

| | | | | |
|---|---|---|---|---|
| 2004/0020704 | A1* | 2/2004 | Sunda | B60K 37/06 180/315 |
| 2004/0155863 | A1 | 8/2004 | Sakamaki et al. | |
| 2006/0195801 | A1* | 8/2006 | Iwamura | G06F 3/0489 715/864 |
| 2006/0202865 | A1* | 9/2006 | Nguyen | G06F 1/1626 341/22 |
| 2007/0143010 | A1 | 6/2007 | Jensfelt | |
| 2008/0180393 | A1 | 7/2008 | Iwamura | |
| 2009/0073255 | A1* | 3/2009 | Yamamoto | G06F 3/011 348/36 |
| 2009/0180071 | A1* | 7/2009 | Fateh | A61B 3/024 351/203 |
| 2009/0189835 | A1* | 7/2009 | Kim | G09G 3/3677 345/80 |
| 2009/0305787 | A1* | 12/2009 | Ikejiri | A63F 13/06 463/38 |
| 2010/0167825 | A1* | 7/2010 | Sternberg | A63F 13/98 463/47 |
| 2011/0065510 | A1* | 3/2011 | Borrel | A63F 13/24 463/38 |
| 2011/0260969 | A1* | 10/2011 | Workman | A63F 13/98 345/161 |
| 2011/0267374 | A1* | 11/2011 | Sakata | G06F 3/013 345/672 |
| 2011/0285636 | A1* | 11/2011 | Howard | G06F 3/04815 345/173 |
| 2012/0169610 | A1* | 7/2012 | Berkes | G06F 3/04883 345/173 |
| 2012/0188694 | A1 | 7/2012 | Sakakibara et al. | |
| 2013/0058659 | A1* | 3/2013 | Umezu | G06F 1/1632 398/128 |
| 2013/0088437 | A1 | 4/2013 | Nishidate | |
| 2013/0178286 | A1* | 7/2013 | Joynes | G06F 1/1626 463/32 |
| 2013/0215029 | A1* | 8/2013 | Comer, Jr. | G06F 3/04886 345/161 |
| 2014/0031103 | A1 | 1/2014 | Amano et al. | |
| 2014/0195940 | A1* | 7/2014 | Ogiso | G06F 3/04845 715/765 |
| 2014/0266990 | A1* | 9/2014 | Makino | G02B 27/017 345/8 |
| 2014/0274394 | A1* | 9/2014 | Willis | G06F 1/1632 463/37 |
| 2015/0002411 | A1* | 1/2015 | Hwang | G06F 3/0416 345/173 |
| 2015/0224409 | A1* | 8/2015 | Hayashida | A63F 13/87 463/31 |
| 2015/0378459 | A1* | 12/2015 | Sawada | G06F 3/0488 345/173 |

FOREIGN PATENT DOCUMENTS

| | | |
|---|---|---|
| JP | 2004-192634 A | 7/2004 |
| JP | 2010-231655 A | 10/2010 |
| JP | 2012-003305 A | 1/2012 |
| JP | 2012-064074 A | 3/2012 |
| JP | 2012-152357 A | 8/2012 |
| JP | 2013-117553 A | 6/2013 |
| JP | 2014-023720 | 2/2014 |
| JP | 2014026093 A * | 2/2014 |

OTHER PUBLICATIONS

European Search Report (7 pgs.) dated Oct. 9, 2015 issued in corresponding European Application No. 15171133.0 with an at least partial English-language translation.

\* cited by examiner

FIG. 1 (A) PERSPECTIVE VIEW
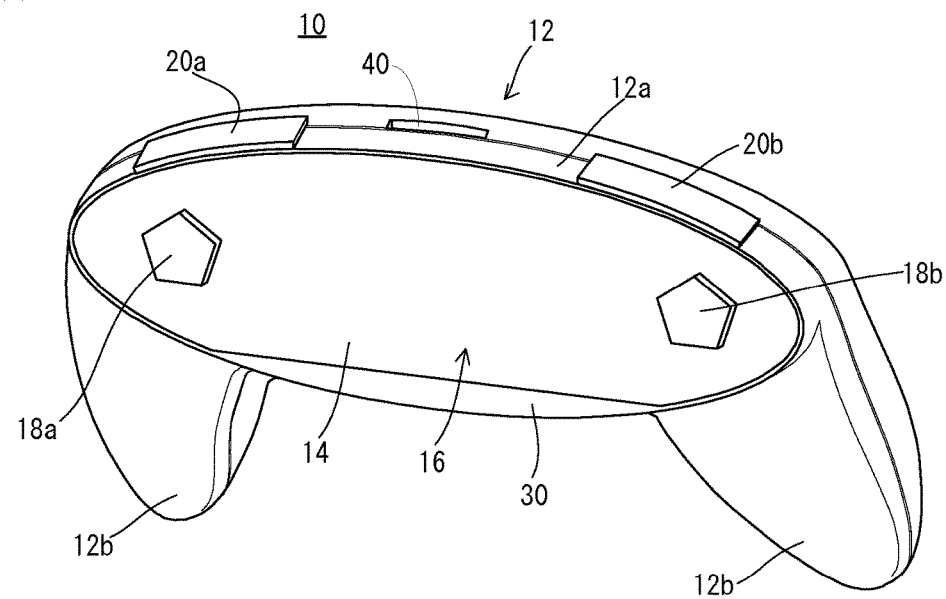
FIG. 1 (B) FRONT VIEW
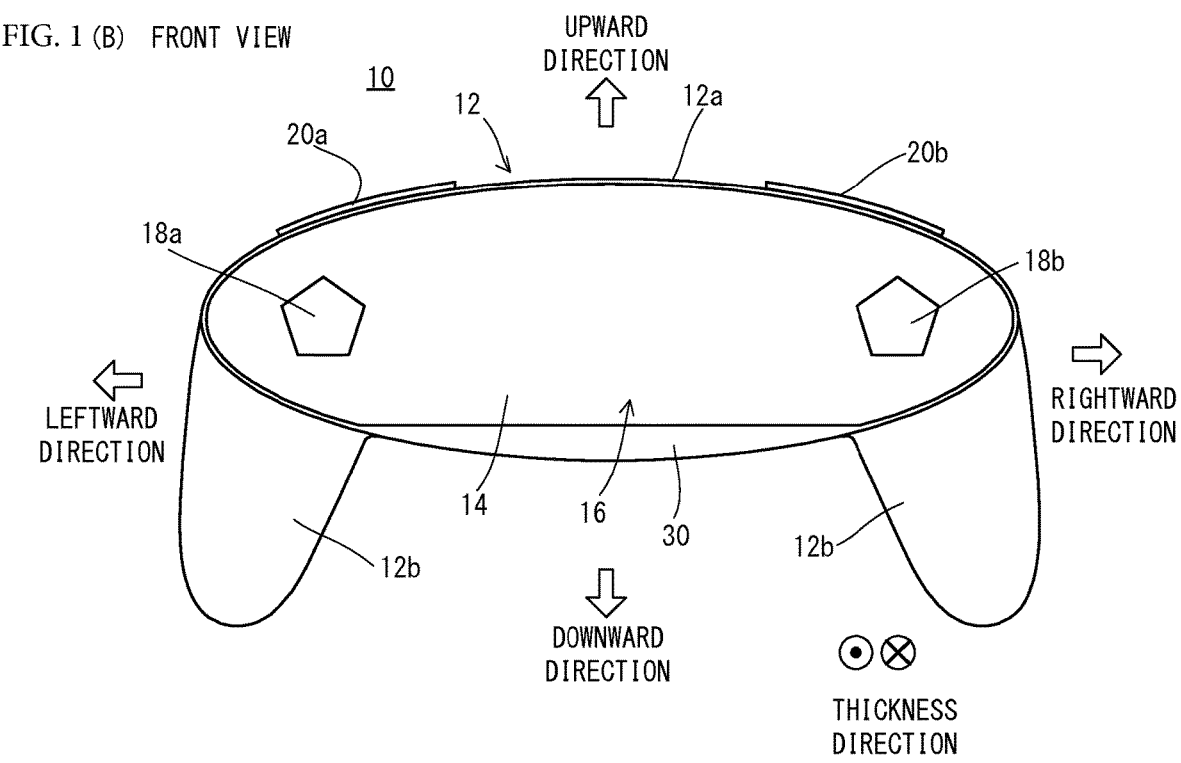

FIG. 3 (A)  TOUCH PANEL OF ELECTROSTATIC CAPACITANCE SYSTEM
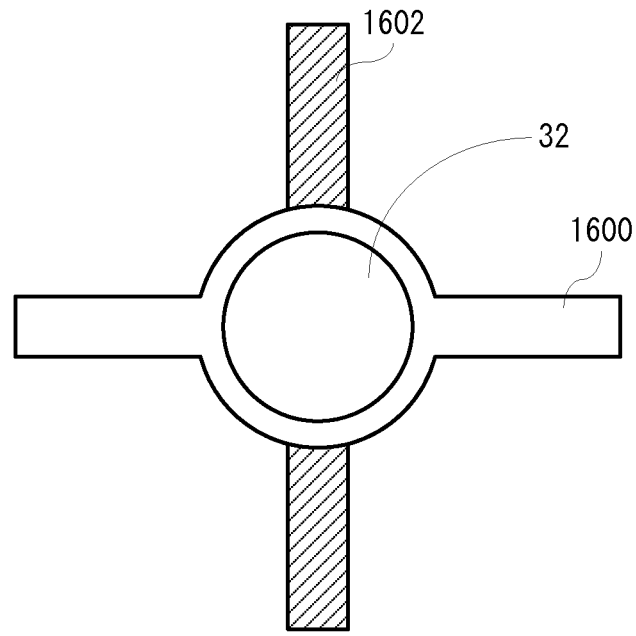
FIG. 3(B)  Y-AXIS DIRECTION
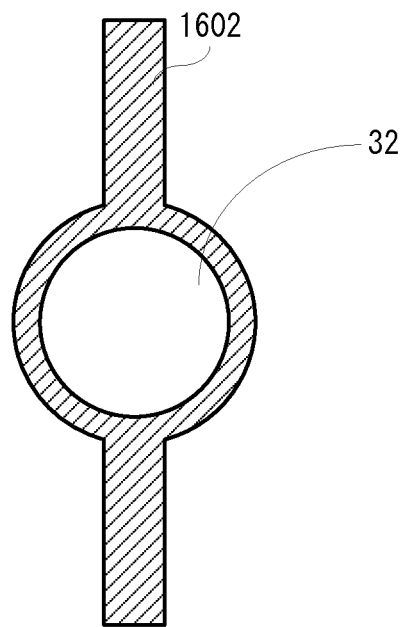

FIG. 4 (A) TOUCH PANEL OF ELECTROSTATIC CAPACITANCE SYSTEM
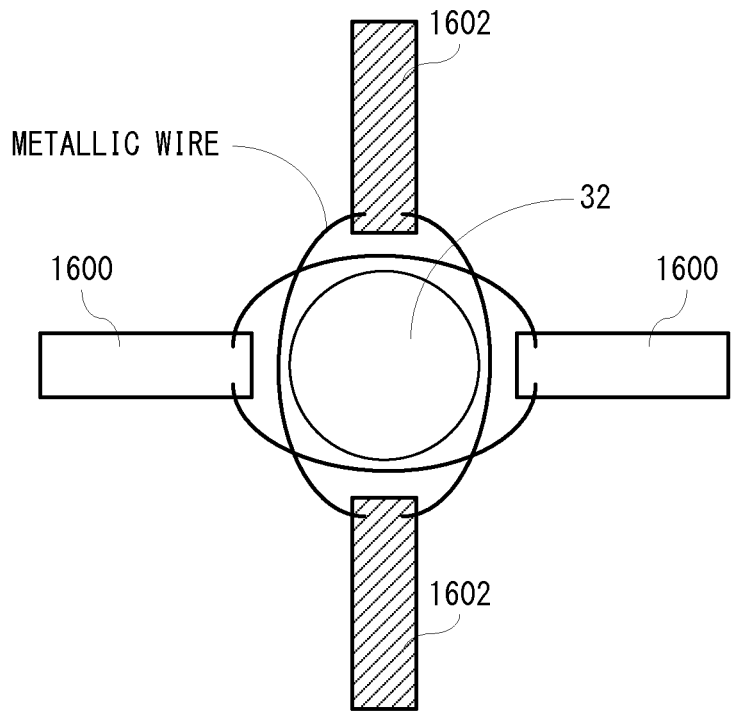
FIG. 4 (B) 4-WIRE TYPE TOUCH PANEL OF RESISTANCE FILM SYSTEM
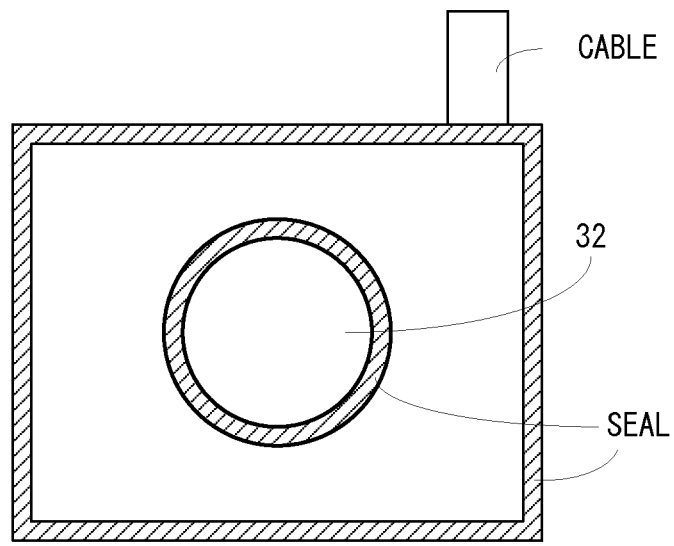

FIG. 5 (A)   FRONT VIEW (NOTCH)
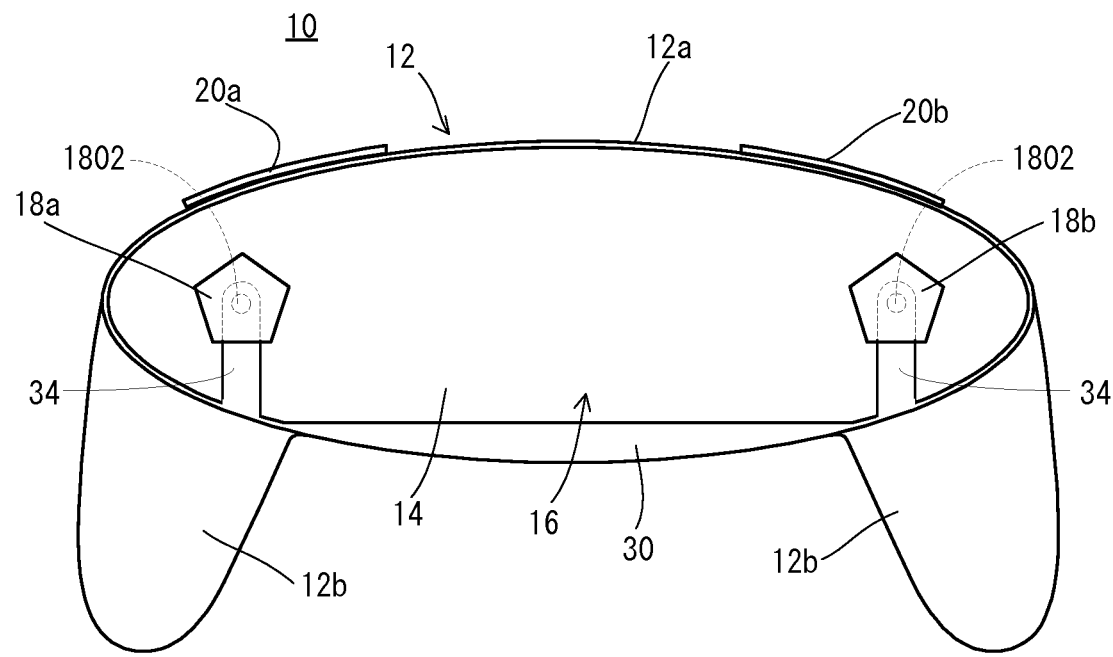
FIG. 5(B)   ITO TRANSPARENT ELECTRODE IN X-AXIS DIRECTION
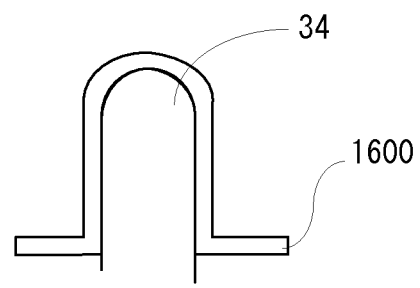
FIG. 5(C)   ITO TRANSPARENT ELECTRODE IN Y-AXIS DIRECTION
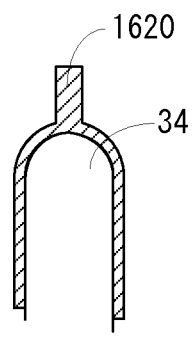

FIG. 6 (A) FURTHER NOTCH
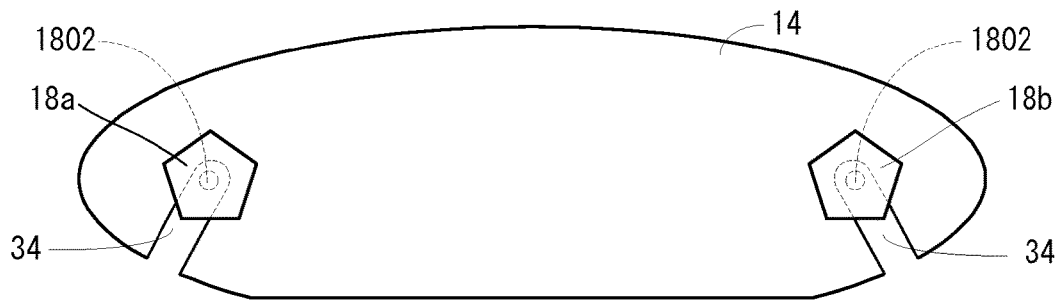
FIG. 6(B) FURTHER NOTCH
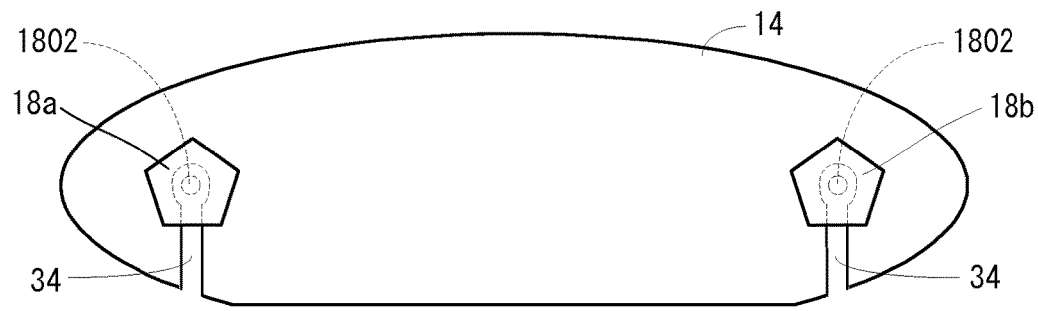
FIG. 6(C) FURTHER NOTCH
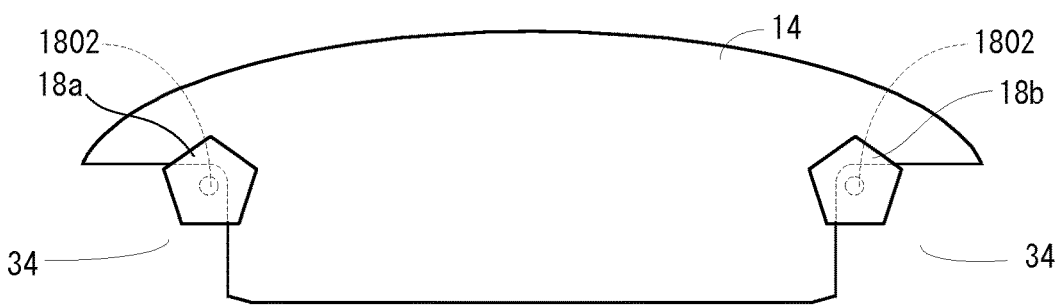

FIG. 16 (A) MAIN MENU SCREEN
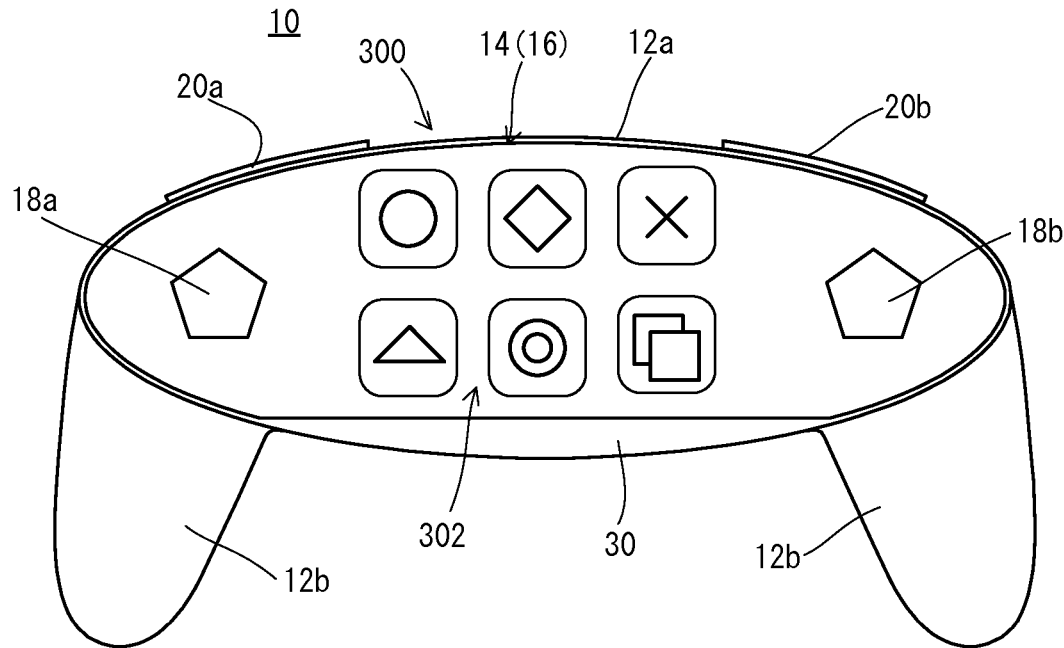
FIG. 16(B) SUBMENU SCREEN
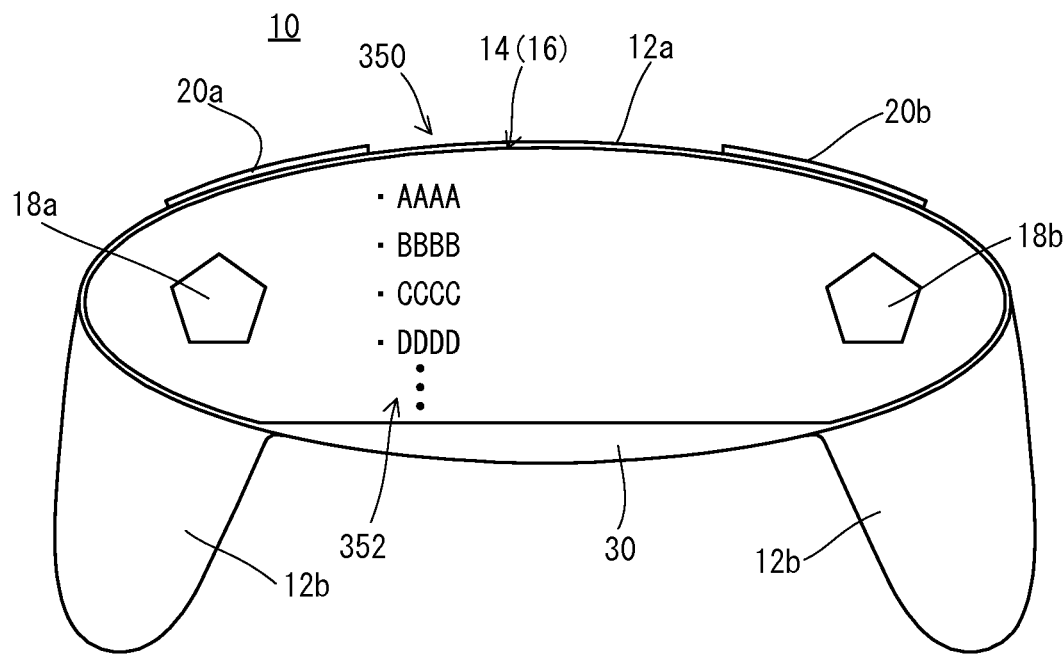

FIG. 17 (A) BROWSER SCREEN (HORIZONTALLY HOLDING)
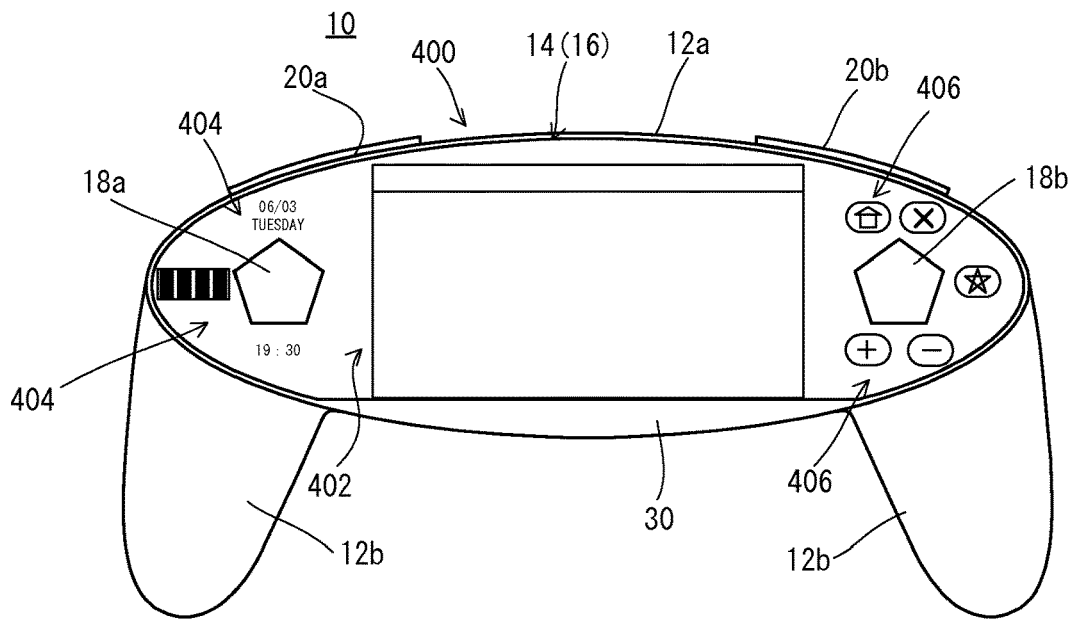
FIG. 17(B) BROWSER SCREEN (VERTICALLY HOLDING)
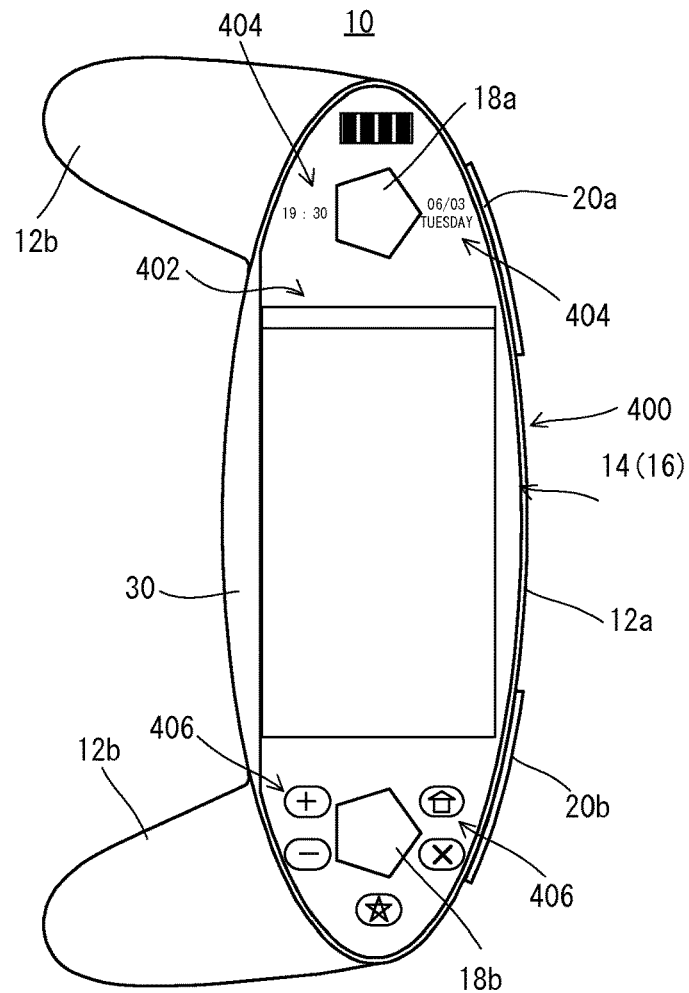

GAME APPARATUS AND INFORMATION PROCESSING APPARATUS

CROSS REFERENCE OF RELATED APPLICATION

The disclosure of the patent application No. 2014-119097 filed on Jun. 9, 2014 is incorporated by reference.

FIELD

This application describes a game apparatus and an information processing apparatus comprising an operation unit.

SUMMARY

It is a primary object of embodiments to provide a novel game apparatus and information processing apparatus.

A game apparatus of a first embodiment comprises a housing having a display panel that displays at least a virtual game space. Furthermore, the game apparatus comprises an operation unit having an operation portion and a detection portion. The operation unit provided penetrates the display panel, and the detection portion is located inside the housing and the operation portion is exposed outside the housing.

An information processing apparatus of a second embodiment comprises a housing having a display panel. Furthermore, the information processing apparatus comprises a first operation unit having an operation portion and a detection portion. The first operation unit provided penetrates the display panel, and the detection portion is located inside the housing and the operation portion is exposed outside the housing.

A third embodiment is according to the second embodiment, wherein the display panel has a hole through which the operation unit penetrates.

A fourth embodiment is according to the second embodiment, wherein the operation portion is partially provided above the display panel in a thickness direction of the housing, and the detection portion is provided below the display panel, the thickness direction being perpendicularity to a display surface of the display panel. That is, the first operation unit is provided so as to sandwich the display panel.

A fifth embodiment is according to the second embodiment, wherein the display panel is an oblong form approximately.

A sixth embodiment is according to the second embodiment, wherein each of left and right end portions of the display panel is a form of an arc.

A seventh embodiment is according to the second embodiment, wherein a size of a front surface of the housing approximately corresponds to a size of the display panel, and the display panel constitutes the front surface of the housing. Therefore, a first rim portion is made relatively narrow.

An eighth embodiment is according to the fifth embodiment, wherein the display panel is approximately elliptical form, and further comprises a first rim portion along at least an arc portion of the display panel.

A ninth embodiment is according to the fifth embodiment, and further comprises a third rim portion close to one long side of the display panel, the third rim portion being larger than a second rim portion along the other long side of the display panel.

A tenth embodiment is according to the fifth embodiment, and further comprises a fourth rim portion that is formed along one long side of the display panel.

An eleventh embodiment is according to the second embodiment, and further comprises a touch panel capable of detecting a touch input to the display panel and a position in a display area of the display panel corresponding to the touch input.

A twelfth embodiment is according to the eleventh embodiment, wherein the first operation unit provided also penetrates the touch panel, and the operation portion is exposed outside the housing.

A thirteenth embodiment is according to the second embodiment, and further comprises a second operation unit having an operation portion located on a surface of the housing different from the surface on which the display panel is provided.

A fourteenth embodiment is according to the second embodiment, wherein the first operation unit is provided in the display panel apart from a center portion thereof.

A fifteenth embodiment is according to the fourteenth embodiment, and further comprises a third operation unit having an operation portion and a detection portion. The third operation unit provided penetrates the display panel, and the detection portion is located inside the housing and the operation portion is exposed outside the housing. The first operation unit and the third operation unit are provided in a left side area and a right side area of the display panel, respectively.

A sixteenth embodiment is according to the fifteenth embodiment, wherein the first operation unit and the third operation unit are provided in a left end portion and a right end portion of the display panel, respectively.

A seventeenth embodiment is according to the second embodiment, wherein the information processing apparatus is a hand-held type.

An eighteenth embodiment is according to the second embodiment, wherein the operation portion of the first operation unit is provided in a range that a thumb of a user is placed when holding the housing.

A nineteenth embodiment is according to the second embodiment, wherein the first operation unit can perform a direction input by tilting or sliding the operation portion.

A twentieth embodiment is according to the second embodiment, wherein the first operation unit can perform a depression input by pushing down the operation portion.

A twenty-first embodiment is according to the second embodiment, wherein the first operation unit can perform a direction input in 360 degrees.

A twenty-second embodiment is according to the second embodiment, and further comprises a virtual space display module configured to display on the display panel a virtual space image captured by a virtual camera.

A twenty-third embodiment is according to the second embodiment, and further comprises an initial screen display module configured to display an initial screen on the display panel according to an operation input by the operation portion.

A twenty-fourth embodiment is according to the second embodiment, and further comprises an operation button display module configured to display a content in a center portion of the display panel, and to display an operation button concerning operating the content near or around the operation portion on the display panel.

A twenty-fifth embodiment is according to the second embodiment, and further comprises a motion detection module configured to detect a motion of the housing.

A twenty-sixth embodiment is according to the twenty-fifth embodiment, wherein the motion detection module includes at least one of an acceleration sensor and a gyro sensor. Therefore, an acceleration of a certain axis direction of the housing is detected, or an angular velocity around a certain axis of the housing is detected.

A twenty-seventh embodiment is according to the second embodiment, and further comprises a vibrator configured to apply vibration to the housing.

A twenty-eighth embodiment is according to the second embodiment, and further comprises an object display module configured to display an object near the operation portion.

A twenty-ninth embodiment is according to the second embodiment, and further comprises an object display module configured to display an object around the operation portion.

A thirtieth embodiment is according to the twenty-eighth embodiment, and further comprise a touch panel capable of detecting a touch input to the object on the display panel.

A thirty-first embodiment is according to the thirtieth embodiment, wherein the object is supplementally displayed near the operation portion.

A thirty-second embodiment is according to the twenty-eighth embodiment, wherein the object is a character, a figure or a sign or symbol and can be selected by a direction input of the operation portion.

A thirty-third embodiment is according to the twenty-eighth embodiment, wherein the object includes an operation history concerning the operation portion. For example, an object representing an operation content of the operation portion is displayed according to a time series.

A thirty-fourth embodiment is according to the twenty-eighth embodiment, and further comprises a second operation unit having a second operation portion located in a surface different from the surface on which the display panel is provided. The object includes operation histories concerning the first operation portion and the second operation portion. For example, objects representing an operation content of the first operation portion and an operation content of the second operation portion are displayed according to a time series.

A thirty-fifth embodiment is according to the twenty-eighth embodiment, wherein the object is an image effect.

A thirty-sixth embodiment is according to the second embodiment, and further comprises a screen display module configured to display a screen of an application on the display panel. The screen display module changes a size of the performing screen to be displayed on the display panel according to a kind of the application or a kind of a screen used in the application. The screens having different aspect ratios are displayed, for example.

A thirty-seventh embodiment is according to the third embodiment, and further comprise a generating module configured to generate image data corresponding to a display screen to be displayed on the display panel. The generating module generates the image data irrespective of the presence or absence of a hole.

A thirty-eighth embodiment is an information processing apparatus, comprising: a housing having a display panel having a hole; and a first operation unit that is provided at least partially in the hole.

A thirty-ninth embodiment is an information processing apparatus, comprising: a housing having a display panel; and an operation unit that is provided in a manner that at least a part thereof is embedded inside the housing and penetrates the display panel.

A fortieth embodiment is an information processing apparatus, comprising: a housing having a display panel; and an operation unit that is surrounded by the display panel when viewing from a front side and penetrates the display panel.

A forty-first embodiment is an information processing apparatus, comprising: a housing having a display panel; and an operation unit having an operation portion and a detection portion to detect an input by the operation portion, wherein the operation unit is surrounded by the display panel, the detection portion is located inside the housing, and the operation portion is exposed outside the housing.

A forty-second embodiment is according to the forty-first embodiment, wherein the display panel has a hole or notch through which the operation unit penetrates.

The above described objects and other objects, features, aspects and advantages of the embodiments will become more apparent from the following detailed description when taken in conjunction with the accompanying drawings.

BRIEF DESCRIPTION OF THE DRAWINGS

FIGS. 1(A) and 1(B) illustrate an appearance of a non-limiting example information processing apparatus of this embodiment, wherein FIG. 1(A) is a perspective view obliquely viewing down the information processing apparatus, and FIG. 1(B) is a front view viewing the information processing apparatus from the front.

FIGS. 3(A) and 3(B) illustrate a non-limiting example method of opening a hole in a touch panel of an electrostatic capacitance system, wherein FIG. 3(A) is an illustration view showing a state where electrodes of an X-axis direction and a Y-axis direction are overlapped, and FIG. 3(B) is an illustration view of a case where only the electrode of the Y-axis direction in FIG. 3(A) is focused on.

FIG. 4(A) is an illustration view showing another non-limiting example method of opening a hole in a touch panel of an electrostatic capacitance system, and FIG. 4(B) is an illustration view showing a non-limiting example method of opening a hole in a touch panel of a resistance film system.

FIG. 5(A) is an illustration view showing a non-limiting example when forming a notch in the touch panel of the electrostatic capacitance system, FIG. 5(B) is an illustration view showing a part of the electrodes in the X-axis direction when forming the notch, and FIG. 5(C) is an illustration view showing a part of the electrodes of the Y-axis direction when forming the notch.

FIGS. 6(A) to 6(C) are illustration views showing other examples when forming a notch in the touch panel of the electrostatic capacitance system.

FIG. 16(A) is an illustration view showing a non-limiting example main menu screen, and FIG. 16(B) is an illustration view showing a non-limiting example sub menu screen.

FIG. 17(A) is an illustration view showing a non-limiting example browser screen when holding the information processing apparatus horizontally, and FIG. 17(B) is an illustration view showing a non-limiting example browser screen when holding the information processing apparatus vertically.

DETAILED DESCRIPTION OF NON-LIMITING EXAMPLE EMBODIMENTS

Figure 2:
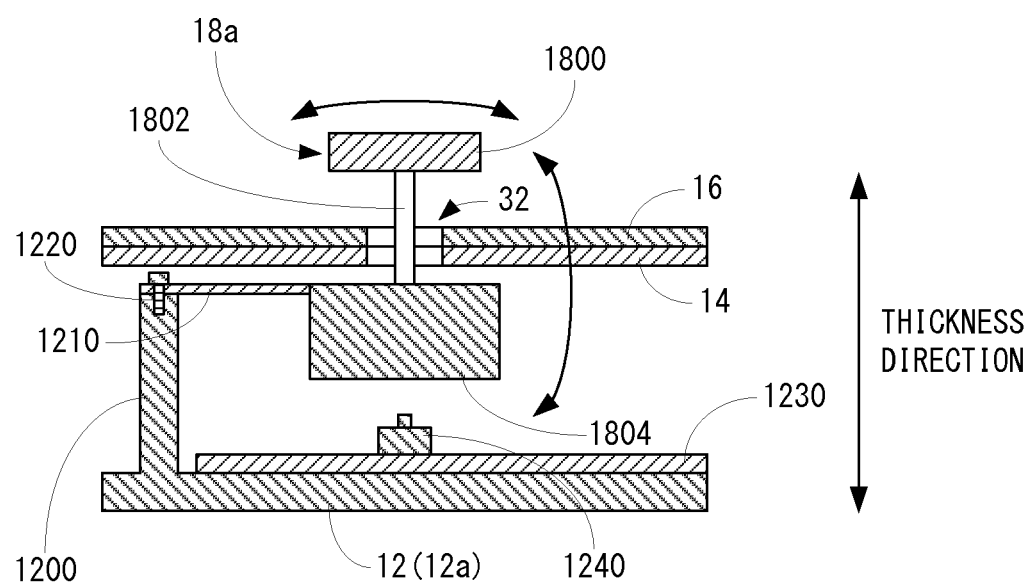
FIG. 2 is a partial cross-sectional view of the information processing apparatus.

With reference to FIG. 1, a non-limiting example information processing apparatus 10 includes a housing 12, and a display panel 14 constitutes one main surface (front surface) of the housing 12. As the display panel 14, an LCD, EL, etc. can be used, for example. Furthermore, as the display panel 14, it is possible to use a display panel allowing stereoscopic view with naked eyes. In such a case, an LCD of a parallax barrier system or an LCD of a lenticular system using a sheet with unevenness (lenticular lens) is used, for example.

The housing 12 is an oblong form, and it is constituted by a first portion 12a having an elliptical form or approximately elliptical form when viewing from the front, and two grip portions 12b that are integrally formed with the first portion 12a and respectively extended obliquely downward from a lower side of the first portion 12a. Therefore, a user or player (hereinafter, simply called "player") can hold the housing 12 with one hand or both hands.

Since the display panel 14 constitutes the front surface of the housing 12 as mentioned above, this display panel 14 is also an oblong form. As seen from FIG. 1(A) and FIG. 1(B), the display panel 14 has the same or approximately the same form and size as those of the elliptical form of the front surface of the first portion 12a. In addition, the display panel 14 is an elliptical form with a long side at a lower end is made a form of a straight line.

Furthermore, since the display panel 14 is fit into the front surface of the first portion 12a, when viewing from the front, an edge (rim portion) 30 is formed in the circumference of the display panel 14 due to a thickness of a side wall of the first portion 12a, etc. The rim portion 30 is formed along the elliptical form of the display panel 14, but formed along a straight line in a part of a lower end of the display panel 14. Therefore, in the part of the lower end of the display panel 14, the rim portion 30, i.e., a non-display portion is made wider (larger) than other portions. A reason why the rim portion 30 in the part of the lower end of the display panel 14 is large is that a plurality of LEDs for a back light of the display panel 14 (LCD) is provided linearly.

Figure 9:
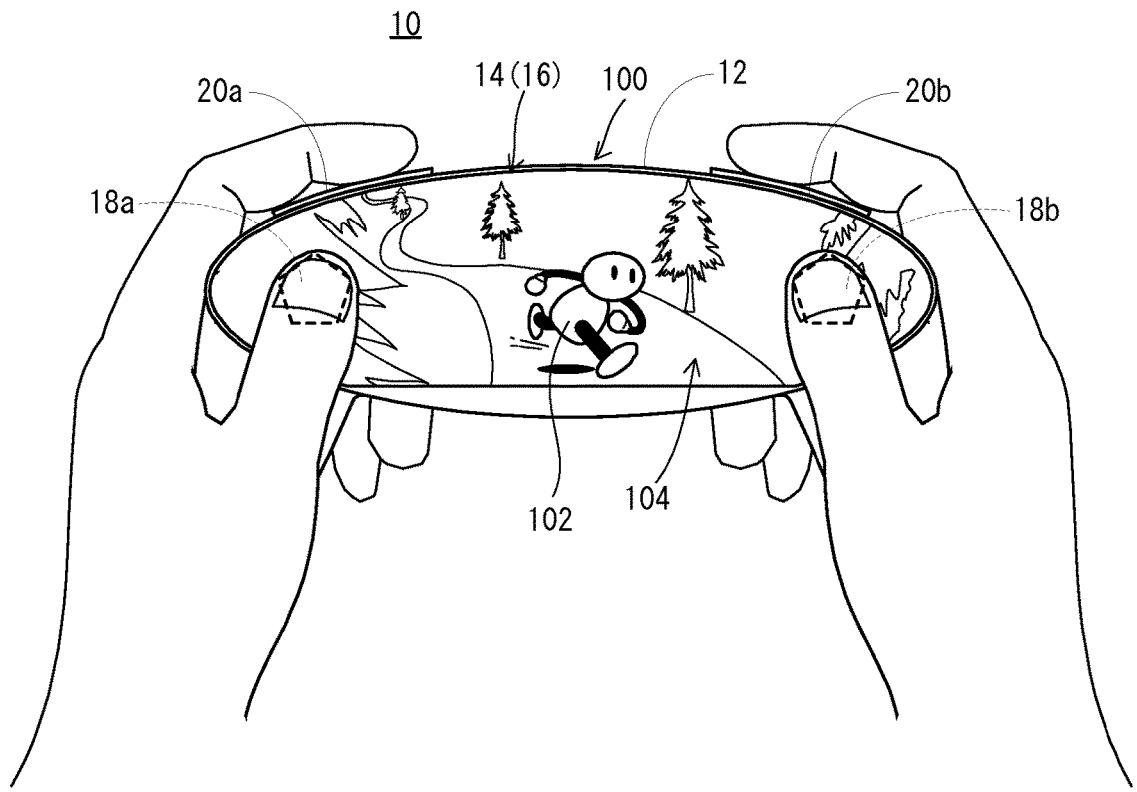
FIG. 9(A) is an illustration view showing a manner that a first operation portion of two operation sticks is hidden when a player holds the information processing apparatus with both hands.
FIG. 9(B) is an illustration view intelligibly showing a relationship of fingers of the player and the two operation sticks when the player holds the information processing apparatus with both hands.

Furthermore, since the rim portion 30 is formed along the elliptical form except the part of the lower end of the display panel 14 and the elliptical form of the front surface of the first portion 12a and the elliptical form (except for the part of the lower end) of the display panel 14 are approximately the same size, the rim portion 30 is lessened as much as possible. Therefore, when holding the information processing apparatus 10 with both hands, portions other than the display panel 14 of the information processing apparatuses 10 become invisible as much as possible in the front side (see FIGS. 9(A) and 9(B)). Therefore, it is thought that the player who views the virtual space displayed on the display panel 14 obtains a high feeling of immersion into the virtual space.

In addition, although a plurality of LEDs are provided in the lower end portion of the information processing apparatus 10 in this embodiment, these may be provided in an upper end portion. Furthermore, it is possible to construct such that a plurality of LEDs are provided in at least one of a left end portion and a right end portion of the information processing apparatus 10.

Furthermore, since the plurality of LEDs are provided in the lower end portion of the information processing apparatus 10 linearly in this embodiment, it is possible to cause the player who sees a game screen 100 (see FIG. 9-FIG. 14, and FIG. 18) described later to recognize the rim portion 30 of the lower end portion of the first portion 12a as a ground surface of a game space. Furthermore, when arranging the plurality of LEDs in the upper end portion of the information processing apparatus 10 linearly, the rim portion 30 is formed in the upper end portion, and therefore, it can be recognized as a ceiling etc. of the game space.

In addition, the plurality of LEDs for a back light may be provided along a curved line of the elliptical form. In such a case, the rim portion 30 is formed along an elliptical form throughout an entire circumference of the display panel 14, and a portion that the plurality of LEDs are provided is made wider (larger) in comparison to other portions.

Furthermore, since the display panel 14 is made into an oblong form as mentioned above, it is possible to make an aspect ratio thereof comparable to a ratio (16:9) of a wide screen.

Although not shown in FIG. 1(A) and FIG. 1(B), a touch panel 16 is provided on the front surface of the display panel 14, and the touch panel 16 is set the same form (size) as the display panel 14 in this embodiment. That is, the touch panel 16 is also an oblong form, and an elliptical form that a part of a long side of a lower end is made into a form of a straight line. Therefore, it is possible to perform a touch input in almost a whole of a display area of the display panel 14. However, the touch panel 16 may be an elliptical form as similar to the form of the front surface of the first portion 12a. Furthermore, as the touch panel 16, a touch panel of an electrostatic capacitance system or a resistance film system can be used.

In this embodiment, unless otherwise especially noted, when describing the embodiment using directions, up, down, left and light directions when viewing the information processing apparatus 10 from the front as shown in FIG. 1(B) and a direction perpendicular to a surface of a piece of paper of FIG. 1(B), i.e., a thickness direction of the information processing apparatus 10 are used. In addition, a surface opposite to the front surface is a rear surface.

Furthermore, the information processing apparatus 10 comprises a first operation stick 18a, a second operation stick 18b, a first operation button 20a and a second operation button 20b. The first operation stick 18a is provided in a position operable by the thumb of the left hand when the player holds the information processing apparatus 10 with one hand or both hands, and similarly, the second operation stick 18b is provided in a position operable by the thumb of the right hand. Furthermore, the first operation button 20a is provided in a position operable by the index finger of the left hand when the player holds the information processing apparatus 10 with both hands, and similarly, the second operation button 20b is provided in a position operable by the index finger of the right hand. In this embodiment, the first operation button 20a and the second operation button 20b are provided on a side surface of the first portion 12a. More specifically, the first operation button 20a is provided in a left end portion of an upper surface of the housing 12, and the second operation button 20b is provided in a right end portion of the upper surface of the housing 12.

Furthermore, a card slot 40 is provided in a center portion of the upper surface of the housing 12. The card slot 40 can be attached with various kinds of card storage media such as a game cartridge, an SD card, a SIM (Subscriber Identity Module) card, etc. Therefore, the information processing apparatus 10 reads (acquires) a program and data from the card storage medium that is attached to the card slot 40, or writes a program and data into a card storage medium. It should be noted that the program is a program for an application such as a game, and the data is data used for processing of the application. Furthermore, in some cases, a personal authentication may be performed.

In addition, although omitted in FIG. 1(A) and FIG. 1(B), the information processing apparatus 10 comprises a speaker 64 (see FIG. 19), and the speaker 64 is provided inside the housing 12, for example. However, a hole for outputting a sound from the speaker 64 to outside the housing 12 is provided in a portion other than the display area of the display panel 14, i.e., a side surface or the rear surface of the housing 12.

In a common game apparatus, a display panel is provided between one or more operation buttons to be operated by the left hand and one or more operation buttons to be operated by the right hand on the surface (front) of the housing.

Accordingly, if it is intended to miniaturize a game apparatus, it is necessary to reduce the number of the operation buttons, to make a size of the operation button small, or to make a size of the display panel small. On the other hand, a game apparatus becomes large if it is intended to enlarge a size of the display panel.

Therefore, this embodiment provides a new information processing apparatus 10 by enlarging a size of the display panel while not enlarging the apparatus.

Specifically, as shown also in FIG. 2, the first operation stick 18a and the second operation stick 18b are provided to be embedded in the display panel 14 and the touch panel 16.

As described later, since the display panel 14 is almost the same as the form and the size of the first portion 12a of the housing 12 when viewing from the front, and the display panel 14 is formed with the holes 32 for embedding the operation sticks (18a, 18b) only, it is possible to use almost all areas except the area that the holes 32 are provided as a display area.

Furthermore, the first operation stick 18a and the second operation stick 18b are provided in the left side and the right side of the first portion 12a (housing 12) excluding center portion of the display panel 14. In this embodiment, the first operation stick 18a is provided in a range that the thumb of the left hand of the player who holds the housing 12 reaches in an end portion of the left side of the first portion 12a. Furthermore, the second operation stick 18b is provided in a range that the thumb of the right hand of the player who holds the housing 12 reaches in an end portion of the right side of the first portion 12a. That is, the first operation stick 18a is provided in the end portion of an area in the left side of the display panel 14, and the second operation stick 18b is provided in the end portion of an area on the right side of the display panel 14.

In addition, FIG. 2 shows a partial cross-section of the information processing apparatus 10 in order to show attachment structure of the first operation stick 18a. Hereinafter, the first operation stick 18a is explained, but the second operation stick 18b is also the same.

As shown in FIG. 2, in this embodiment, the first operation stick 18a is a hardware operation unit, and includes a key top portion 1800, a shaft portion 1802 and a detection portion 1804. Briefly describing, the display panel 14 and the touch panel 16 are formed with the hole 32 that penetrates them, and the first operation stick 18a is provided in a manner that the shaft portion 1802 passes the hole 32. That is, the first operation stick 18a is provided so as to project from the rear side to the front side of the display panel 14 and the touch panel 16. Therefore, the first operation stick 18a is surrounded by the display panel 14. When viewing the information processing apparatus 10 (housing 12) from the front, the key top (operation portion) of the first operation stick 18a is embedded within the display area of the display panel 14.

Here, the operation portion means a portion to which the player contacts, and typically, is a portion to which a finger for the user contacts. For example, a surface portion of the key top portion 1800 of the operation stick (18a and 18b), a surface portion of a cross button, a surface portion of a depressible button, an oblong surface portion of an operation button (20a and 20b) described later, a surface portion of a direction operation stick of a slide system, an outer peripheral surface of a wheel of a jog dial, etc. correspond to the operation portion.

Furthermore, in FIG. 2, the key top portion 1800 of the first operation stick 18a is provided above a display surface of the display panel 14 and a detection surface of the touch panel 16 (front side of the thickness direction). That is, the first operation stick 18a is provided such that the key top is exposed outside the housing 12. Furthermore, as shown also in FIG. 2, the first operation stick 18a is provided such that a lower end portion of the key top portion 1800 lies above the detection surface of the touch panel 16. Therefore, since the first operation stick 18a is hard to be brought into contact to the surface of the display panel 14, it is possible to prevent the surface of the display panel 14 from being damaged. Although the key top portion 1800 is formed in a form of an equilateral pentagon, it may be formed in other polygon form or circular form. A size of the surface of the key top portion 1800 is made larger than a size (diameter) of the above-mentioned hole 32. Therefore, the hole 32 is not visible when the information processing apparatus 10 is seen from the front (see FIGS. 1(A) and 1(B)).

The detection portion 1804 pivotally supports the shaft portion 1802 of the first operation stick 18*a* and detects a direction that the key top portion 1800 and the shaft portion 1802 are tilted, and outputs information about a detected direction (direction designating signal). This detection portion 1804 is provided below the display panel 14 and the touch panel 16. Thus, the first operation stick 18*a* is embedded in the display panel 14 and the touch panel 16. Furthermore, the detection portion 1804 is electrically connected to a circuit board 1230 described later, and designation of a direction (direction input signal) is transmitted to a CPU 50 mounted on the circuit board 1230.

In an inside of the first portion 12*a*, there is provided with a wall 1200 that stands up in the thickness direction of the housing 12 from the bottom surface of the information processing apparatus 10 (housing 12). There is provided with a thin-plate like elastic member (flat spring) 1210 having one end portion that is secured to the wall 1200 with a screw 1220 and the other end portion that is secured to the detection portion 1804. Therefore, the first operation stick 18*a* (the key top portion 1800 and shaft portion 1802) is depressible to the rear side of the housing 12, and is returned to its home position (position shown in FIG. 2) by a restoring force of the flat spring 1210. Furthermore, the circuit board 1230 is provided on the bottom of the housing 12. A tact switch 1240 is mounted on the circuit board 1230 so as to form a line in the first operation stick 18*a* on a straight line of the thickness direction of the housing 12. In fact, the circuit board 1230 is provided to be slightly separated from the bottom using a spacer etc. As mentioned above, if the first operation stick 18*a* is pushed down toward the rear side of the housing 12, the detection portion 1804 is brought into contact to the tact switch 1240, and the tact switch 1240 is turned on. Since circuit components such as a CPU 50 described later are also mounted on the circuit board 1230, a signal (signal of a depression input) that the tact switch 1240 is turned on is given to the CPU 50.

Therefore, as for the first operation stick 18*a*, it is possible to perform not only an operation (tilting operation) that the key top portion 1800 and the shaft portion 1802 are tilted in an arbitrary direction (direction in 360 degrees) such as up, down, left, right and oblique directions when viewing the housing 12 from the front but also an operation that the key top portion 1800 and the shaft portion 1802 are pushed down(depression) toward the rear side of the housing 12.

Thus, since the operation stick (18*a*, 18*b*) is provided by opening the hole 32 in the display panel 14 and the touch panel 16 in this embodiment, the electrodes provided in an inside of each of the display panel 14 and the touch panel 16 are made to detour along the hole 32.

As shown in FIG. 3 (A), in a portion that the hole 32 is formed in the touch panel 16 of an electrostatic capacitance system, the electrode (ITO transparent electrode, for example) that should pass the position that the hole 32 is formed is made to detour so as to pass outside the hole 32. In addition, in the touch panel 16, an ITO film is provided independently in an X-axis direction and Y-axis direction. Therefore, as shown in FIG. 3(A), the ITO transparent electrode 1600 of the X-axis direction is made to detour along the hole 32, and as understood well by FIG. 3(B) showing only the ITO transparent electrode 1602 of the Y-axis direction, the ITO transparent electrode 1602 of the Y-axis direction onto which the ITO transparent electrode 1600 of the X-axis direction is superposed is also made to detour along the hole 32. Thus, when the ITO transparent electrode 1600 and the ITO transparent electrode 1602 are made to detour, detection precision of the touch panel 16 falls in this portion; however, if this portion is excluded from a detection range, the other detection range is not affected at all because the hole 32 is hidden by the key top portion 1800 of the operation stick (18*a*, 18*b*).

Furthermore, image generating processing (rendering) for displaying an image (the game screen 100, a character input screen 200 (see FIG. 15) described later, etc.) on the display panel 14 is performed such that an image to be displayed on a normal display panel 14 without the hole 32 is generated. As mentioned above, since there are no semiconductor elements in a portion of the hole 32 of the display panel 14, the image is not only displayed in the portion. Therefore, a portion that the electrode is made to detour becomes black in the display panel 14.

Furthermore, as shown in FIG. 4(A), in place of making the ITO transparent electrodes 1600 and 1602 detour, the ITO transparent electrodes 1600 and 1602 may be respectively divided in the portion of the hole 32 and divided portions may be connected to each other by a metal wire (metal wiring). In such a case, it is possible to lower a resistance value in comparison to a case where the ITO transparent electrodes 1600 and 1602 are made to detour.

Furthermore, in a case where a 4-wire type touch panel 16 of a resistance film system is used, in the portion that the hole 32 is opened, the resistance file may be sealed as shown in FIG. 4(B).

In addition, FIG. 3 and FIG. 4 are mere illustration, in fact, the number of the electrodes is determined according to the detection precision of the touch panel 16 (resolution in a case of the display panel 14), and a plurality of electrodes are made to detour in the portion that the hole 32 is provided. Furthermore, as another example, by arranging a plurality of touch panels (of the electrostatic capacitance system or resistance film system) to avoid the portion of the hole 32, and by detecting a touch input to each of the plurality of touch panels, a touch input by the player to a portion except the portion of the hole 32 may be made possible.

FIG. 5(A) shows an example of a case where the touch panel 16 of an electrostatic capacitance system is formed with a notch 34 instead of the hole 32. As shown in FIG. 5(A), the notch 34 has a width somewhat larger than the diameter of the shaft portion 1802 of the first operation stick 18*a* or the second operation stick 18*b*, and is formed toward a lower part from a position that the shaft portion 1802 is provided. Therefore, even if it is in a case where the first operation stick 18*a* and the second operation stick 18*b* cannot be disassembled into the key top portion 1800, the shaft portion 1802 and the detection portion 1804, it is possible to attach the first operation stick 18*a* and the second operation stick 18*b* through the notch 34 of the display panel 14 and the touch panel 16. Furthermore, even if it is in a case where the first operation stick 18*a* and the second operation stick 18*b* can be disassembled into the key top portion 1800, the shaft portion 1802 and the detection portion 1804, it is possible to attach these without disassembly.

When forming the notch 34 as shown in FIG. 5(A), for example, as shown in FIG. 5(B) and FIG. 5(C), the ITO transparent electrodes 1600 and 1602 are made to detour or avoid the notch 34, respectively in the touch panel 16. Even if the ITO transparent electrodes 1600 and 1602 are made to detour, since such a portion is hidden with the thumb of the player who holds the information processing apparatus 10 (see FIG. 9), not only the content displayed on the display panel 14 does not have a bad influence but also there is no inconvenience in particular as an area that a touch input cannot be performed.

In addition, although FIG. 5(B) and FIG. 5(C) show the ITO transparent electrode 1600 of the X-axis direction and the ITO transparent electrode 1602 of the Y-axis direction separately, these are provided in the portion that the same notch 34 is formed in layers.

Furthermore, the notch 34 does not need to be limited to a form shown in FIG. 5(A), and may be formed in other forms. As shown in FIG. 6 (A), for example, the notch 34 may be formed to obliquely extend toward a lower part from a position that the shaft portion 1802 is provided.

Furthermore, although the notch 34 is formed to extend downward as shown in FIG. 5(A), a portion around the shaft portion 1802 and the other portion may be different in size (width) as shown in FIG. 6(B). A reason is that it is necessary to cut relatively largely in the portion around the shaft portion 1802 since the shaft portion 1802 is tilted, but the shaft portion 1802 is not tilted in the other portion, while the shaft portion 1802 passes through the other portion at the time that the information processing apparatus 10 is assembled.

Furthermore, as shown in FIG. 6(C), the notch 34 that lower end portions of the right and left of the display panel 14 are cut off in a fan form may be formed. This is because such a portion is partly hidden by the thumb of the player and also deviates from an effective visual field described later. If such structure is adopted, assembly of the information processing apparatus 10 is easy.

In addition, although illustration is omitted, even if the notch 34 is formed as shown in FIG. 6(A)-FIG. 6(C), the ITO transparent electrodes 1600 and 1602 are made to detour or avoid the notch 34 like a case shown in FIG. 5(B) and FIG. 5(C).

Figure 7:
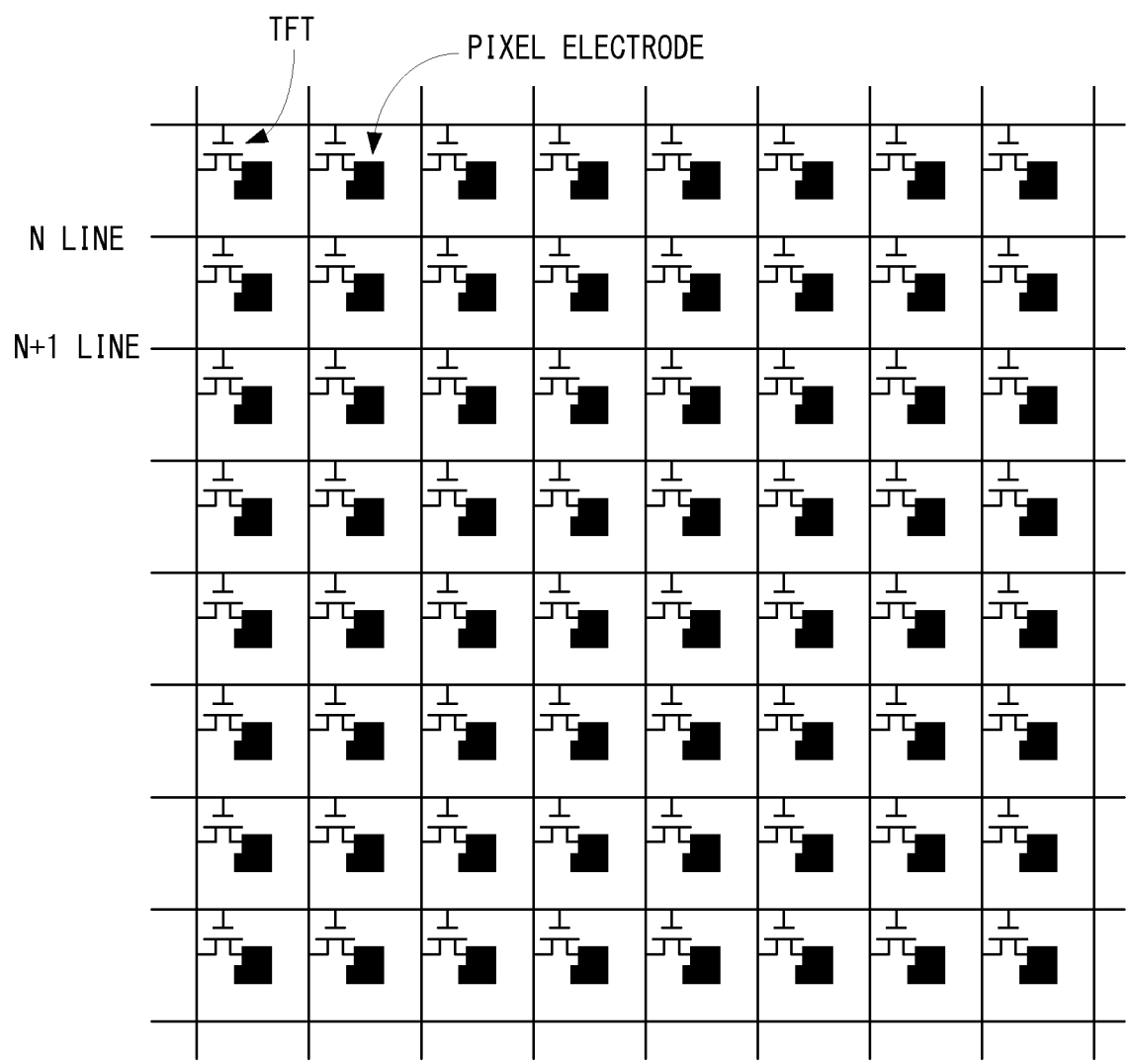
FIG. 7 is a circuit diagram showing a part of an electric circuitry of a common LCD.
Figure 8:
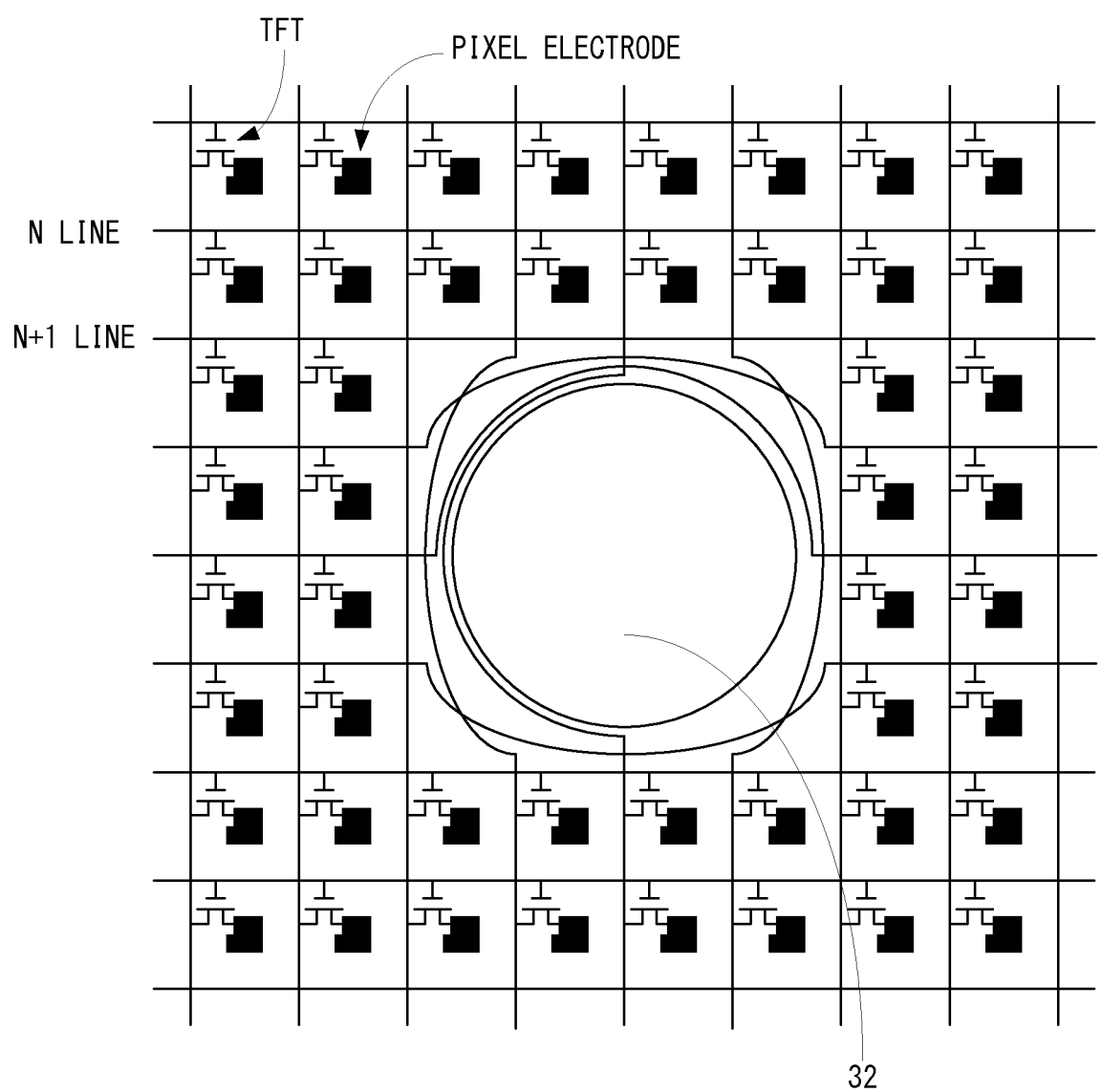
FIG. 8 is a circuit diagram showing a part of an electric circuitry when opening a hole in the LCD.

FIG. 7 is a circuit diagram showing a part of an electric circuitry of a common LCD that is an example of the display panel 14. As shown in FIG. 7, in the LCD, a plurality of leads (wiring) are formed in vertical and horizontal directions, and each square of a grid formed with these leads corresponds to a pixel. In the LCD, one TFT (Thin Film Transistor) is provided for each pixel. FIG. 7 shows a circuit diagram for 8 pixels×8 pixels. Furthermore, although vertical lead and horizontal lead intersect in FIG. 7 (FIG. 8 is also the same), these are not connected. In each pixel, the TFT functions as a switch to turn a pixel electrode on or off. Furthermore, a gate of each TFT is connected to the horizontal lead (gate electrode line), and a source of each TFT is connected to the vertical lead (source electrode line). Then, a pixel electrode is connected to a drain of the TFT in each pixel.

A controller of the LCD controls the LCD to draw one by one line (progressive scan). Therefore, when a line to be drawn is determined, and a gate voltage is applied to the determined line, and a source voltage is applied to each vertical lead, a current flows between the source and the gate of each TFT that the gate is connected to the determined line, and a source voltage is applied to each pixel electrode connected to each TFT. For example, N line is drawn by applying the gate voltage to a second line from the top in FIG. 7 and applying the source voltage to each vertical lead. When the N line is drawn, N+1 line is drawn next. Thus, drawing is performed for each line from the first line to the last line. Furthermore, by changing the source voltage, the voltage applied to the pixel electrode is changed, and thus, the strength (tone) of a light is expressed.

As described above, when forming the hole 32, as shown in FIG. 8, the TFT and the pixel electrode are omitted in the portion that the hole 32 is formed. In the example shown in FIG. 8, the TFTs and the pixel electrodes are omitted for 4 pixels×4 pixels in center. Furthermore, about the portion that the hole 32 is formed, the vertical lead and horizontal lead are respectively made to detour along the hole 32.

Thus, as for the pixels in the portion that the hole 32 is formed, although the portion that the leads are made to detour becomes dark because the TFTs and the electrodes are omitted, the darkened portion is usually hidden by the key top portions 1800 of the first operation stick 18*a* and the second operation stick 18*b* and therefore, invisible to the player. Furthermore, when the player operates the first operation stick 18*a* and the second operation stick 18*b*, even if these are tilted, the above-mentioned darkened portion is hidden with the thumb of the player. Therefore, it is thought that it does not cause the player to feel uncomfortable, and there is no inconvenience in particular by having formed the hole 32 in the display panel 14.

In addition, although illustration is omitted, the vertical leads and the horizontal leads are made to detour or avoid the notch 34 in also a case where the notch 34 is formed in the display panel 14 instead of the hole 32, like a case the notch 34 is formed in the touch panel 16.

Furthermore, the first operation button 20*a* and the second operation button 20*b* are hardware operation units, and each includes an oblong operation portion that the player operates (depresses). As shown in FIG. 1(A) and FIG. 1(B), an operation portion is provided in right and left side surfaces of an upper side of the housing 12. That is, the key tops of the first operation button 20*a* and the second operation button 20*b* are provided in the surface different from the surface that the display panel 14 is provided out of the housings 12. Thus, the first operation button 20*a* and the second operation button 20*b* are provided in positions that the player can operate with fingers when holding the housing 12 in an area except an area (portion) that the display panel 14 is provided of the housing 12. Therefore, the operation button (20*a*, 20*b*) may be provided in the rear side of the housing 12.

One end portion in the horizontal direction of each of the first operation button 20*a* and the second operation button 20*b* is pivotally supported by the housing 12, and the other end portion is rotated with the axis of the one end portion. In addition, the other end portion is provided with a coil spring between the housing 12, and if the finger is released from the operation portion after the player pushes down (depresses) the first operation button 20*a* or the second operation button 20*b* with the finger, the other end portion of the first operation button 20*a* or the second operation button 20*b* returns to the home position due to the restoring force of the coil spring. Furthermore, a switch board is provided inside the housing 12, and a switch of the switch board is turned on by depressing the first operation button 20*a* or the second operation button 20*b*. Since the switch board is electrically connected to the above-mentioned circuit board 1230, a signal (signal of a depression input) that the switch of the switch board is turned on is also applied to the CPU 50.

In addition, each of the first operation button 20*a* and the second operation button 20*b* has one end portion close to a right end and a left end of the housing 12 is pivotally supported and the other end portion close to the center of the housing 12 is made as a free end. However, each of the first operation button 20*a* and the second operation button 20*b* may be constituted in a manner that the one end portion is made as a free end and the other end portion is pivotally supported.

Figure 9B:
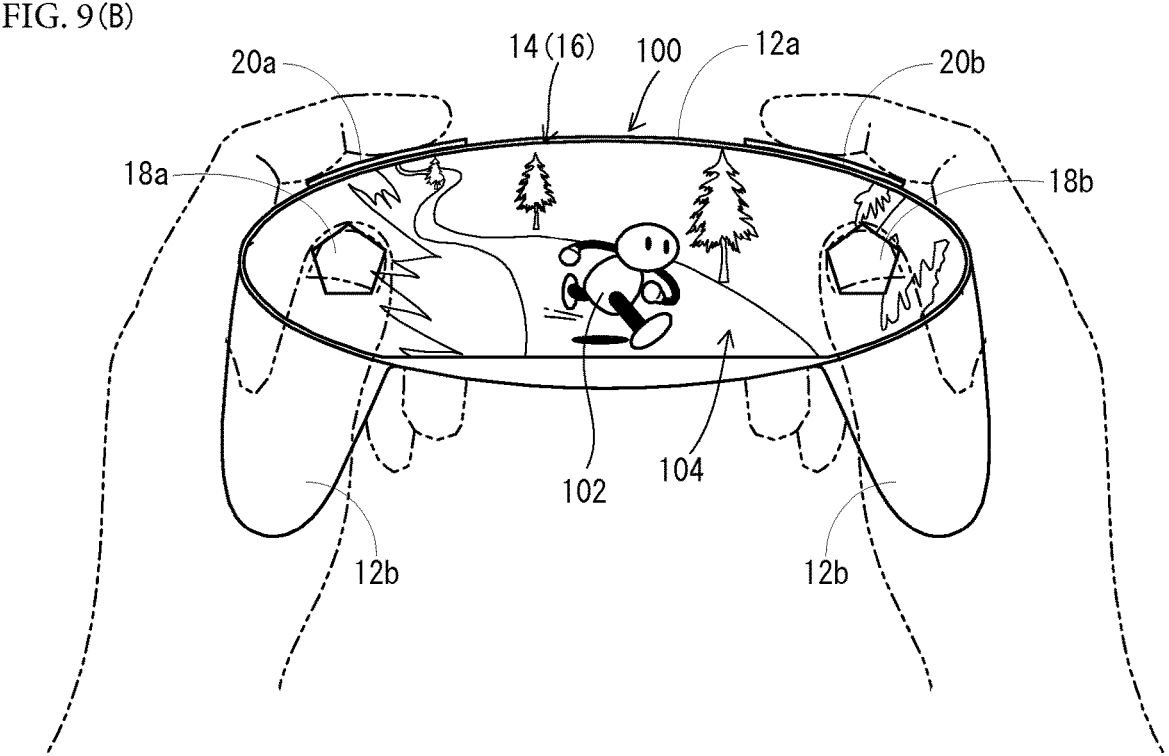

FIG. 9(A) and FIG. 9(B) show an example of a case where a virtual game space (game screen 100) is displayed on the display panel 14 of the information processing apparatus 10 and the player plays a game. The game screen 100 is an image that the virtual game space in which a predetermined object is provided is imaged by a virtual camera. Specifically, a predetermined character or predetermined object such as a background, a person etc. is provided (rendered) in a three-dimensional space such as the virtual game space, and a two-dimensional image that is viewed from the virtual camera (viewpoint) is generated. That is, an image of the three-dimensional space viewed from the viewpoint is projected on a two-dimensional virtual screen by viewpoint conversion processing such as perspective projection transformation, and a projected two-dimensional image is displayed as the game screen 100.

FIG. 9(A) shows a manner that the key top portions 1800 of the first operation stick 18a and the second operation stick 18b are hidden when the player holds the information processing apparatus 10 with both hands. On the other hand, FIG. 9(B) intelligibly indicates relationships of the fingers of the player to the first operation stick 18a and the second operation stick 18b.

As mentioned above, the information processing apparatus 10 is held by the player with both hands. As shown also in FIG. 9(A) and FIG. 9(B), at this time, the left thumb is placed on the key top portion 1800 of the first operation stick 18a and the right thumb is placed on the key top portion 1800 of the second operation stick 18b, for example. Furthermore, a left index finger is brought into contact to the first operation button 20a in a depressible manner and a right index finger is brought into contact to the second operation button 20b in a depressible manner, for example. Then, the left side grip portion 12b is held by a palm, middle finger, fourth finger and little finger of the left hand and in a similar manner, the right side grip portion 12b is held by a palm, middle finger, fourth finger and little finger of the right hand, for example.

In this embodiment, since the first portion 12a is an elliptical form when viewed from the front, and each of the right and left end portions of the first portion 12a is made a semi-circular form or approximately semi-circular form, and therefore, it is easy for the player to hold the first portion 12a (housing 12), i.e. the information processing apparatus 10. That is, since each of the right and left end portions of the first portion 12a (housing 12) is formed in a form of arc, when the player holds the information processing apparatus 10 (housing 12) by hand, a finger being bent is along a side surface of each of the right and left end portions. Therefore, it is easy to hold. Each of the right and left end portions of the display panel 14 is also formed in a form of arc. It should be noted that the form of arc means a state of being curved like a bow, it is not necessary for each of the right and left end portions of the housing 12 when viewing the housing from the front to be necessarily a part of a (perfect) circle, to become to be projected outward like a bow. Therefore, the display panel 14 is in a form similar to a form of the visual field of the human being as describe later.

A player character 102 is displayed on a background image 104 in an example of the game screen 100 shown in FIG. 9(A) and FIG. 9(B). The player character 102 performs an arbitrary action according to an operation by the player. In the example of the game screen 100 shown in FIG. 9(A) and FIG. 9(B), a manner that the player character 102 moves (runs) on a mountain path according to an operation of the player is shown. The game of this embodiment is an action role playing game, and according to the operation of the player, the player character 102 moves in the virtual game world, fights with an enemy character including a boss character, acquires an item, and/or uses an item.

In this embodiment, as mentioned above, the display panel 14 is provided so as to occupy almost a whole of the front surface of the first portion 12a that is an elliptical form or approximately elliptical form when viewing from the front, and the game screen 100 is displayed on a whole of a display surface (display area). For example, the elliptical form or approximately elliptical form of the display panel 14 is the same or approximately the same as a form that visual filed ranges of both eyes are composed with each other. Therefore, in a case where the player holds the information processing apparatus 10 with a predetermined distance (30 cm, for example) from the own eye, for example, the effective visual field including a discriminable visual field agrees or approximately agrees with a center portion of the game screen 100, and a stable field of fixation covers an entire range of the game screen 100(whole of the display area of the display panel 14).

In addition, the discriminable visual field means a high-density information processing range (less than about 5 degrees in the center) that is excellent in visual performance such as eyesight. Furthermore, the effective visual field means a range that an eye-gaze can be moved in an instant and information acceptance is possible in high efficiency (level: ±15 degrees, upper: 8 degrees, lower: 12 degrees). Then, the stable field of fixation means a range that information acceptance is possible by movement of an eyeball and a head reasonably (level: ±30 degrees-45 degrees, upper: 20 degrees-30 degrees, lower: 25 degrees-30 degrees).

Since the game screen 100 is displayed within a range that is thus covered by not only the effective visual field but the stable field of fixation, it is possible to display an image such as the player character 102 to be noted within the effective visual field, and an image around the image to be noted outside the effective visual field. Therefore, it is possible to enhance a feeling of immersion into the virtual space (game).

Therefore, in this embodiment, an operation stick (18a, 18b) is not provided in a center area in the front surface of the first portion 12a such as the discriminable visual field and the effective visual field, and the operation stick is provided in each of the right and left end portions of the first portion 12a so as to avoid the image to be noted becomes difficult to be seen. That is, the operation stick (18a, 18b) is provided in a position that does not become an obstacle of the image to be noted.

In addition, in this embodiment, it is thinkable that since the own thumb overlaps on the image (game screen 100) of the virtual space to be seen, a higher feeling of immersion can be obtained by the player.

Figure 10:
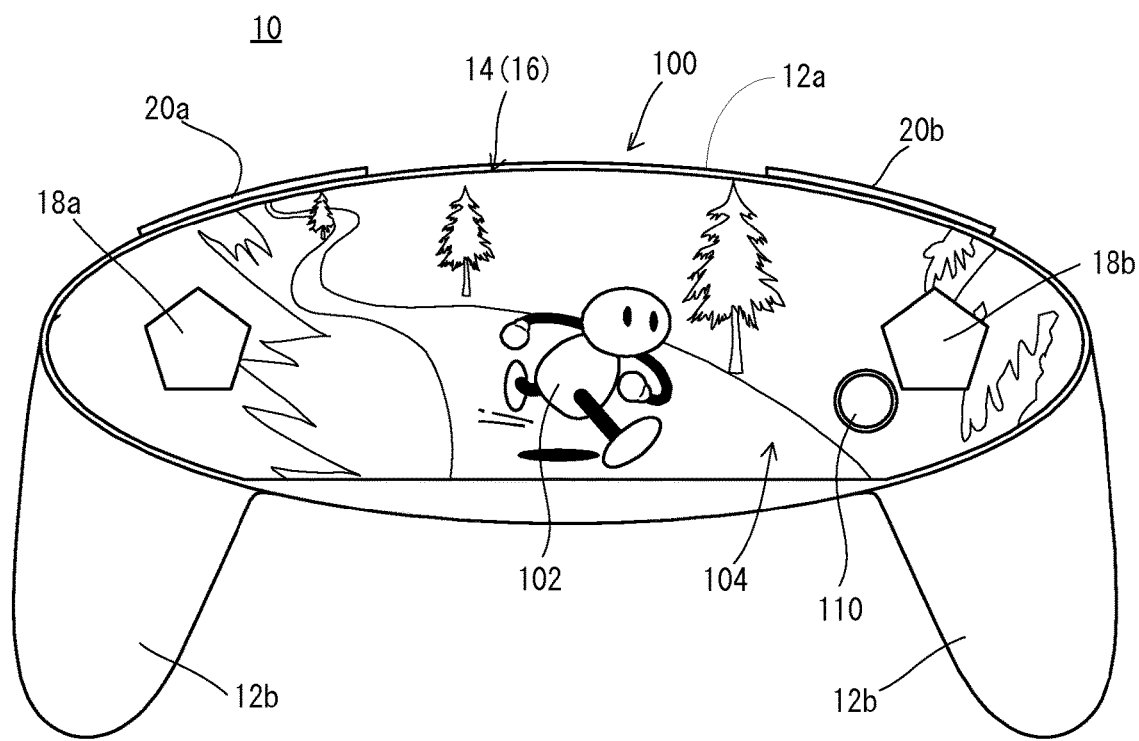
FIG. 10 is an illustration view showing a non-limiting example game screen displayed on the display panel of the information processing apparatus.

FIG. 10 shows a further example of the game screen 100. In the game screen 100 shown in FIG. 10, a button image 110 is displayed near the second operation stick 18b. If the button image 110 is touched, for example, according to this, an instruction that is set to the button image 110 is input. Therefore, by assigning to the button image 110 an instruction different from an instruction that is input when depressing the second operation stick 18b, it is possible to input more variegated instructions. Furthermore, if the button image 110 is displayed supplementally (or additionally or supportively) to the second operation stick 18b in a range near the second operation stick 18b and the thumb on the right hand of the player reaches, it is possible to use the second operation stick 18b and the button image 110 as such a push button of the common game controller.

In addition, a position that displays the button image 110 may be set arbitrarily by the player. For example, if the button image 110 is displayed in a range near the first operation stick 18a and the left thumb reaches, it is also possible to make it button arrangement that is easy to operate for the player of a left-handed player who operates a push button with the left thumb. Furthermore, the button image 110 may be displayed outside the first operation stick 18a or the second operation stick 18b, whereby the center part of the game screen 100 can be made conspicuous.

Furthermore, the button image 110 should just be displayed at a proper timing such as a case of being required for operation of a game, and does not need to be displayed always.

In addition, although a detailed description is omitted, in this embodiment, a coordinate system of the display panel 14 and a coordinate system of the touch panel 16 are made the same, and therefore, the CPU 50 can know a position in a display area of the display panel 14 corresponding to a touch position based on the touch coordinate data corresponding to a touch input. This is true in the following.

Figure 11:
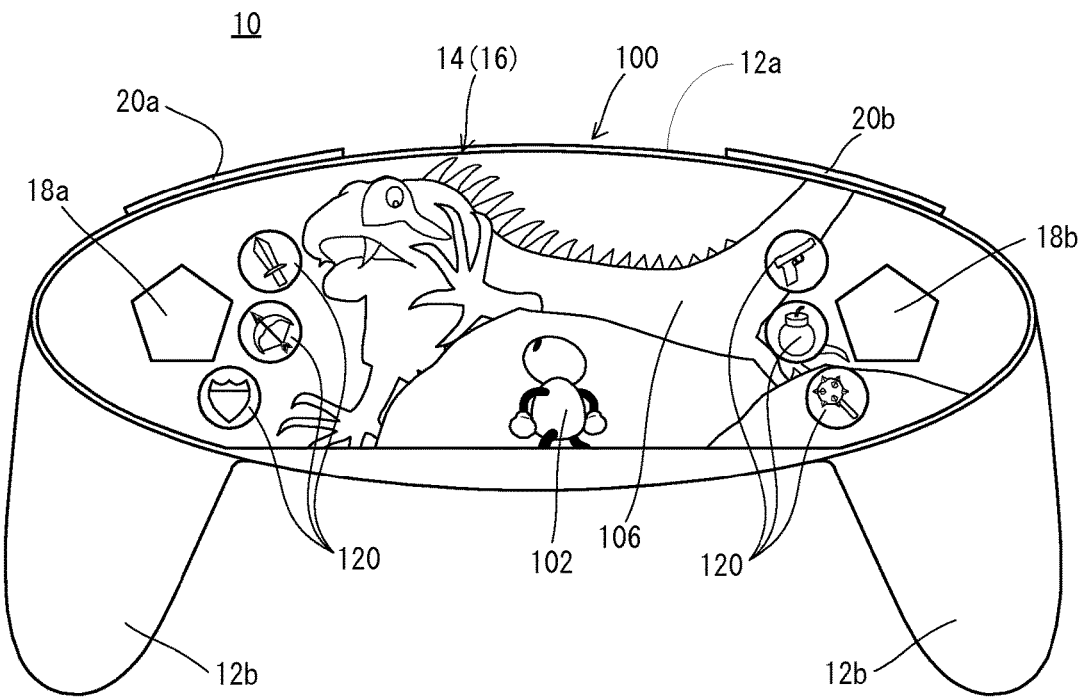
FIGS. 11(A) and 11(B) are illustration views showing a further example of the game screen displayed on the display panel of the information processing apparatus.
Figure 11B:
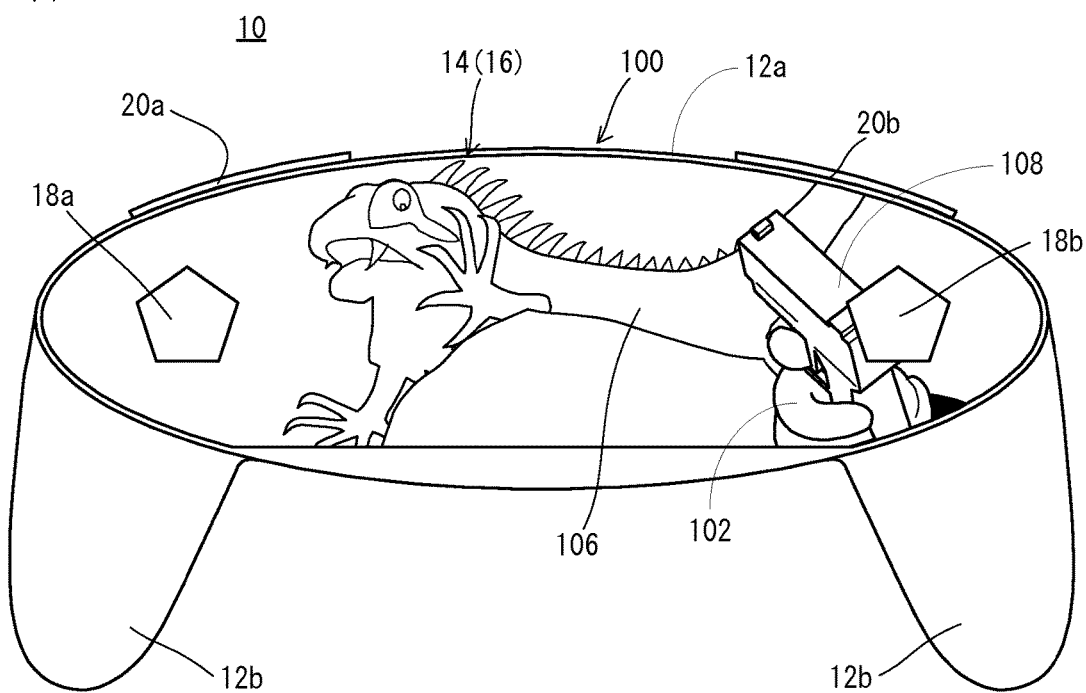

FIG. 11(A) and FIG. 11(B) show a further example of the game screen 100. An enemy character 106 is displayed in a screen center of the game screen 100 shown in FIG. 11(A), and the player character 102 turns to the enemy character 106. Furthermore, near each of the first operation stick 18a and the second operation stick 18b, a plurality of item images 120 are displayed. Although illustration is omitted, a background image is also displayed in the game screen 100 shown in FIG. 11(A) (FIG. 11(B) is the same).

On the game screen 100 shown in FIG. 11(A), by touching the item image 120, an item can be used. Since the item image 120 is thus displayed near the first operation stick 18a and the second operation stick 18b, it is possible to use an item by selecting a desired item by a touch input and depressing the first operation stick 18a or the second operation stick 18b near the item, for example. This is an example and should not be limited. When instructing the use of an item, the first operation stick 18a or the second operation stick 18b should just be pushed.

In addition, the item image 120 is displayed about the item that the player character 102 owns. Furthermore, the item image 120 should just be displayed according to a predetermined timing (event) such as a case where there is a displaying instruction by the player or a case of battling against the enemy character 106, and does not need to be displayed always.

In the game screen 100 shown in FIG. 11(A), for example, if the item image 120 that an image of a gun is drawn is selected (touched), it is determined that the player character 102 uses a gun object 108. Then, the game screen 100 as shown in FIG. 11(B) becomes to be displayed on the display panel 14. The game screen 100 shown in FIG. 11(B) is drawn with a first-person viewpoint of the player character 102, and a part of hand of the player character 102 is displayed. Furthermore, since having determined the use of the gun object 108 as mentioned above, the gun object 108 is grasped by the hand of the player character 102. A point that the enemy character 106 is displayed in the screen center is the same as the game screen 100 of FIG. 11(A). Furthermore, since the item to be used is selected, the item image 120 is non-displayed in the game screen 100 shown in FIG. 11(B).

As shown also in FIG. 11(B), the part of the hand of the player character 102 and the gun object 108 are displayed near the second operation stick 18b. For example, an operation that makes the gun object 108 move or shoot a bullet is performed by the second operation stick 18b. Therefore, since the gun object 108 is displayed near the thumb of the player, a feeling that the player is directly operating the gun object 108 is obtained.

That is, since the game screen 100 drawn from the first-person viewpoint is displayed on the display panel 14 having a form similar to a form of the visual field of the human being, the player can obtain a feeling of immersion into the virtual game space. Furthermore, since the gun object 108 is displayed near the thumb of the player, it is thought that a higher feeling of immersion can be obtained.

Figure 12:
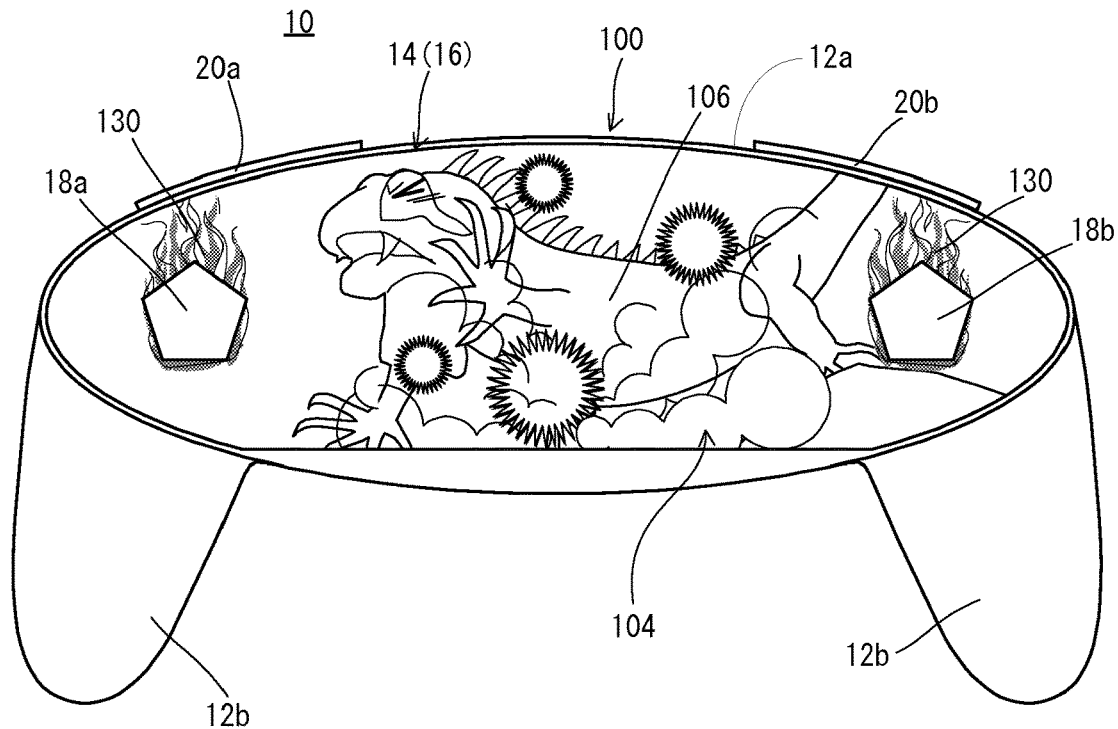
FIG. 12 is an illustration view showing a further example of the game screen displayed on the display panel of the information processing apparatus.

FIG. 12 shows a further example of the game screen 100. In the game screen 100 shown in FIG. 12, an enemy character 106 is displayed in the screen center and a background image 104 in a manner that a spark is scattered in part and is full of smoke is displayed. Furthermore, an object (flame object) 130 that imitates flames is displayed around the first operation stick 18a and the second operation stick 18b. For example, it is shown a situation that by operating at least one of the first operation stick 18a and the second operation stick 18b by the player, the player character is caused to emit the flame to attack the enemy character 106 with the spark and smoke generated by the flame. Thus, by displaying an image effect corresponding to a physical operation of the player around the operation stick (18a, 18b), it is possible to display the game screen 100 with ambience. Therefore, it is possible to more raise a feeling of immersion.

However, the game screen 100 shown in FIG. 12 is an example, and should not be limited. For example, in a music game, when making the player tilt or depress the first operation stick 18a and/or the second operation stick 18b according to the music, images of music notes may be displayed near the first operation stick 18a or the second operation stick 18b according to such an operation. Furthermore, in a role playing game, when making the player character acquire an item according to an operation of the first operation stick 18a and/or the second operation stick 18b, the image effect indicative of having acquired the item may be displayed near or around the first operation stick 18a or the second operation stick 18b. Furthermore, in an action game, when making the player character attack the enemy character according to an operation of the first operation stick 18a and/or the second operation stick 18b, the image effect indicating the attack having succeeded or gone wrong may be displayed near or around the first operation stick 18a or the second operation stick 18b.

Figure 13:
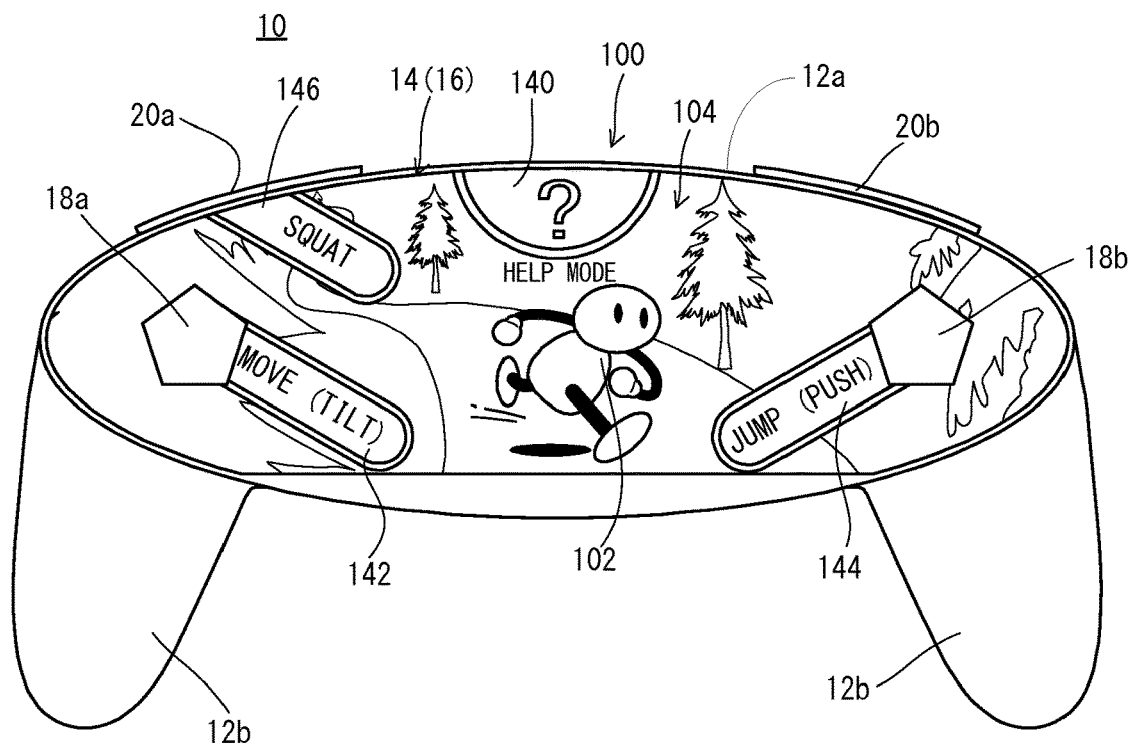
FIG. 13 is an illustration view showing a further example of the game screen displayed on the display panel of the information processing apparatus.

FIG. 13 shows a further example of the game screen 100. In the game screen 100 shown in FIG. 13, a player character 102 and a background image 104 are displayed as shown in FIG. 9(A) and FIG. 9(B). Furthermore, in the game screen 100 shown in FIG. 13, an index image 140 indicative of a help mode is displayed in an upper end portion in the screen center and a character string of "help mode" is displayed below the same. Furthermore, a guide image 142 is displayed near the first operation stick 18a. Here, the guide image 142 is displayed in the game screen 100 in contact with the first operation stick 18a or its key top in appearance. Similarly, a guide image 144 is displayed near the second operation stick 18b. Similarly, a moving image 146 is displayed near the first operation button 20a. The guide images 142, 144 and 146 are images for explaining an operation content (the content of instructions) of corresponding touch panel 16, operation stick (18a, 18b) and operation button (20a, 20b). In addition, the guide images 142 and 144 explain not only the operation content but an operation method. Therefore, it can be understood that if tilting the first operation stick 18a in a direction that the guide image 142 is extended, it is possible to move the player character 102 in the virtual space in the direction that the guide image 142 is extended in the screen, for example. It can be understood that if depressing the second operation stick 18b, it is possible to make the player character 102 jump. Then, it can be understood that if pushing the first operation button 20a, it is possible to make the player character 102 squat.

Such the guide images 142, 144 and 146 are displayed at a predetermined timing such as a case where the player selects the help mode (instructs to display the guide), a case where the game is started or a case where there is no operation by player beyond a predetermined time period.

Furthermore, although one guide image (142, 144, 146) is displayed corresponding to each input portion of the first operation stick 18a, the second operation stick 18b and the first operation button 20a in this embodiment, not necessary to be limited to this. For example, if a plurality of operations (instructions) can be performed by a plurality of different operation methods for one input portion, it is also possible to display a guide image for each of the plurality of operation methods. For example, since the direction input and the depression input are possible for the operation stick (18a, 18b), when an operation corresponding to each is assigned, the guide image corresponding to the assigned operation is displayed.

Figure 14:
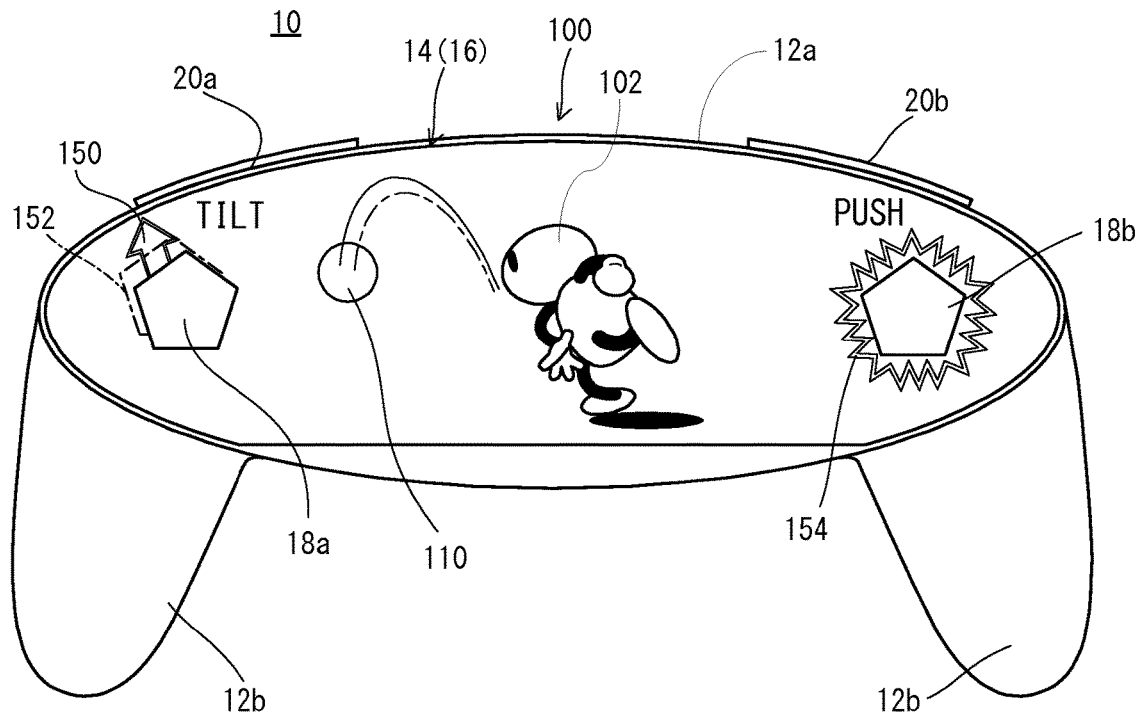
FIG. 14 is an illustration view showing a further example of the game screen displayed on the display panel of the information processing apparatus.

FIG. 14 shows a further example of the game screen 100. In the game screen 100 shown in FIG. 14, a player character 102 in a manner of throwing an object (ball object) 110 that imitates a ball is displayed. Furthermore, near the first operation stick 18a, an arrow mark (guide image) 150 that points a predetermined direction (here, left slant upper) is displayed, and a guide image 152 that is for indicating that the first operation stick 18a is tilted in a direction that the arrow mark points and imitates the key top portion 1800 of the first operation stick 18a is displayed while being blinked, for example. In FIG. 14, a dotted line shows that the guide image 152 is blinking. However, it is not necessary to make blink. Furthermore, near the guide image 150, a character string of "tilt" is displayed. Furthermore, the guide image 154 that shows that the second operation stick 18b is to be pushed is displayed around the second operation stick 18b, and a character string of "push" is displayed near this guide image 154.

The game screen 100 as shown in FIG. 14 is displayed when replaying the game processing based on an operation of the player, for example. For example, a history of operation by the player (history of operation data) is stored from the start to the end of the game together with a time period (absolute time) after the game start, and a play image by the player is reproduced (replayed) based on the history of the operation data (hereinafter called "replay data"). At this time, the guide images (150, 152, 154, etc.) representing the history of the operation performed by the player using the touch panel 16, operation stick (18a, 18b) and operation button (20a, 20b) (history of the operation content and the operation method) are displayed on the game screen 100. Therefore, the player can see the history of the operation when playing the game together with the play image.

Therefore, by acquiring the replay data of other player and replaying the same, the player can see the operation content and the operation method of the other player together with the play image, for example. Furthermore, as similar to the replay data, by acquiring data (exemplar data) including the operation data that becomes an exemplar for playing and the absolute time period from the game start and replaying the exemplar data, the player can see the contents of operation and the operation methods of the exemplar together with the play image.

However, it is not necessary to store a whole of the replay data or the exemplar data from the start to the end of the game, and the replay data or the exemplar data about an arbitrary part may be sufficient.

Furthermore, replay (reproduction) processing is performed according to an operation of the player or according to a predetermined event during the game.

Figure 15:
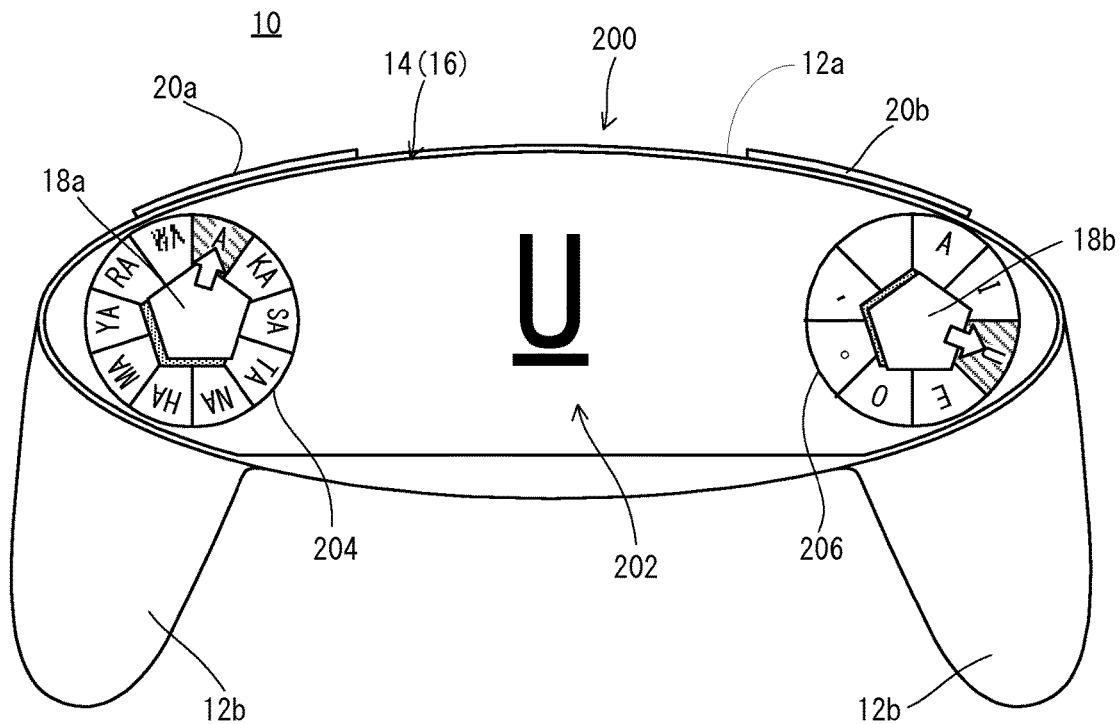
FIG. 15 is an illustration view showing a non-limiting example character input screen displayed on the display panel of the information processing apparatus.

FIG. 15 shows an example of a character input screen 200. A display area 202 that displays an input character in the screen center is formed in the character input screen 200 shown in FIG. 15. Guide images 204 for inputting a consonant (Japanese "a"-"wa" columns) are displayed around the first operation stick 18a. Furthermore, guide images 206 for inputting a vowel (rows of syllables on the Japanese syllabary table that ends with the vowel sound "a"-"o") and punctuation are displayed around the second operation stick 18b.

In addition, in the example of the character input using the character input screen 200 shown in FIG. 15, when Japanese Hiragana are put in order according to the Japanese syllabary table, the Hiragana decided with a consonant ("a"-"wa" columns) and a vowel (vowel sound "a"-"o") is input.

If the player makes the first operation stick 18a tilt, a consonant being displayed in a tilted direction is selected. If the first operation stick 18a is pushed down in a state where the consonant is selected, the consonant being selected is decided as a consonant of a character to be input. Similarly, if the second operation stick 18b is made to tilt, a vowel being displayed in a tilted direction is selected. If the second operation stick 18b is pushed down in a state where the vowel is selected, the vowel being selected is decided as a vowel of a character to be input. Accordingly, a character based on the decided consonant and the decided vowel is decided, and a decided character is input. Although illustration is omitted, the characters being input are displayed on the upper end portion of the display area 202 in order.

In addition, if pushing down the second operation stick 18b in a state where a period or comma is selected by tilting the second operation stick 18b, a period or comma in a selected state is decided. In this case, the period or comma being decided is input as it is.

In addition, a vowel and a consonant should just be decided when inputting a character, and it does not need to be limited to a deciding order.

In the example shown in FIG. 15, a direction that the operation stick (18a, 18b) is tilted is indicated by a white arrow mark. Furthermore, in the example shown in FIG. 15, a situation that "a" column is decided as a consonant and vowel sound "u" is decided as a vowel, and thus, Japanese Hiragana "u" is input is shown. In addition, in FIG. 15, by giving slant lines to the background of a character, it is indicated that the above-mentioned column and vowel sound are selected or decided.

Furthermore, although a case where a character is to be input is described in the example shown in FIG. 15, it does not need to be limited to the case where a character is to be input. It is possible to select the content that is indicated by the image displayed near or around the first operation stick 18a or the second operation stick 18b by tilting the first operation stick 18a or the second operation stick 18b, and further, to decide the selected content by depressing the first operation stick 18*a* or the second operation stick 18*b*. By selecting and deciding the item image 120 in the game screen 100 shown in FIG. 11 by such an operation method, for example, it becomes possible to use the item.

In addition, such the character input screen 200 is displayed according to an instruction by the player or at an arbitrary timing that a character is to be input.

Although a case where Japanese Hiragana is input is described in this embodiment, it does not need to be limited to this. It is also possible to input the alphabet. In such a case, it is unnecessary to decide a vowel and a consonant unlike Japanese Hiragana, by making the operation stick (18*a*, 18*b*) tilt to input the alphabet currently displayed in the tilted direction as it is.

Furthermore, although a case where a character is input is described in this embodiment, numerals and symbols or signs may be input, or figures (character images) may be input.

Furthermore, in such an information processing apparatus 10, on the front side of the display surface of the display panel 14, the touch panel 16 is provided and the key top portions 1800 of the first operation stick 18*a* and the second operation stick 18*b* are also provided. Therefore, when the first operation stick 18*a* or the second operation stick 18*b* is tilted, for example, the thumb may touch the touch panel 16. Furthermore, when the touch panel 16 is being touched, the finger having touched is brought into contact to the operation stick (18*a*, 18*b*), and the operation stick (18*a*, 18*b*) may be tilted. In such a case, in addition to the direction input of the first operation stick 18*a* or the second operation stick 18*b*, the touch input of the touch panel 16 is applied.

Therefore, in this embodiment, in a case where the direction input of the first operation stick 18*a* and/or the second operation stick 18*b* is receivable and the touch input of the touch panel 16 is also receivable, by invalidating the input received later, information processing corresponding to the operation that the player does not intend is not performed.

That is, when the touch input of the touch panel 16 is applied in a state where the direction input of at least one of the first operation stick 18*a* and the second operation stick 18*b* is applied, the touch input is invalidated. In this embodiment, the touch coordinate data based on a touch input is deleted. Therefore, the information processing is not performed based on the touch input.

However, this is a mere example and does not need to be limited. For example, what is necessary is, in the above-mentioned case, just to avoid touching to the touch panel 16 by the tilting operation when inputting the direction input in a case where the direction input of at least one of the first operation stick 18*a* and the second operation stick 18*b* is applied. Therefore, it may be made to invalidate a touch input about a range (invalid range) somewhat larger than a range that the key top portion 1800 of the first operation stick 18*a* and the second operation stick 18*b* can be tilted (moved). By determining such an invalid range in advance, in a case where the direction input of at least one of the first operation stick 18*a* and the second operation stick 18*b* is applied, the touch coordinate data corresponding to the touch input detected in the invalid range that is determined in advance should just be deleted. In this case, by determining the touch input of those other than the invalid range is an intentional touch input of the player, it is possible to perform the information processing according to this touch input.

On the other hand, when the direction input of at least one of the first operation stick 18*a* and the second operation stick 18*b* is applied in a case where the touch input of the touch panel 16 is applied, the direction input data corresponding to the direction input is invalidated. The direction input data is deleted in this embodiment. Therefore, the information processing based on this direction input data is not performed.

Furthermore, when performing the information processing (processing of application) while receiving both of the touch input of the touch panel 16 and the direction input of the first operation stick 18*a* and/or the second operation stick 18*b*, the correction processing mentioned above is unnecessary.

FIG. 16(A) shows an example of a main menu screen 300. A plurality of menu icons 302 are displayed in the screen center in the main menu screen 300 shown in FIG. 16(A). A predetermined operating system is installed in the information processing apparatus 10, for example, and the menu icon 302 is an icon for various kinds of applications that operates on this operating system.

The main menu screen 300 is an initial screen that is displayed on the display panel 14 when the information processing apparatus 10 is started, for example, and the main menu screen 300 is also displayed on the display panel 14 at a time that the performance of the arbitrary application of the information processing apparatus 10 is terminated, and at a time that a predetermined operation input is performed while displaying a sub menu screen 350 as shown in FIG. 16(B). In this main menu screen 300, it is possible to perform a desired application by selecting a desired menu icon 302. For example, the predetermined operation input is an operation depressing the first operation stick 18*a* or the second operation stick 18*b*.

It is assumed that a desired application is performed in the main menu screen 300 shown in FIG. 16(A), and then, the sub menu screen 350 as shown in FIG. 16(B) is displayed on the display panel 14. For example, when selecting a piece of music in a music player or a music game, when selecting a course in a racing game or action game that a plurality of courses is prepared, etc., the sub menu screen 350 is displayed. Sub menus 352 are displayed in the sub menu screen 350. The player can select (determine) a desired sub menu 352 by a touch input. If the first operation stick 18*a* or the second operation stick 18*b* is pushed down when such a sub menu screen 350 is currently displayed, the screen returns to the main menu screen 300 as shown in FIG. 16(A).

FIG. 17(A) and FIG. 17(B) show an example of a browser screen 400. FIG. 17(A) shows an example of the browser screen 400 when holding the information processing apparatus 10 horizontally, and FIG. 17(B) shows an example of the browser screen 400 when holding the information processing apparatus 10 vertically.

The browser screen 400 shown in FIG. 17(A) is sideways, and a display area 402 for displaying a content (web page, for example) in the screen center is formed in this browser screen 400. Furthermore, information 404 such as a date, a day of week, battery residual quantity and a time is displayed near or around the first operation stick 18*a*. Furthermore, five (5) operation buttons 406 are displayed near or around the second operation stick 18*b*. By making the first operation stick 18*a* or the second operation stick 18*b* tilt, for example, it is possible to scroll a web page displayed on the display area 402 in a tilted direction, or to move a page in a tilted direction. Furthermore, the operation button 406 is an icon for performing a predetermined operation that is different from scrolling and movement of a page in the browser screen 400. Specifically, in the example shown in FIG. 17(A) and FIG. 17(B), zoom-in, zoom out, display of a web site, close page and registration of page address are assigned to each of the operation buttons 406. However, the function of scrolling and the function of movement of page may be assigned to the operation button 406.

Furthermore, as shown in FIG. 17(B), by holding the information processing apparatus 10 vertically, the browser screen 400 may be displayed vertically. In such a case, the above-mentioned display of the information 404 and the operation buttons 406 is rotated (here, rotated counterclockwise) by 90 degrees, and therefore, an up and down direction is displayed correctly. Furthermore, the content (web page) displayed on the display area 402 is also turned vertically. In addition, displaying the browser screen 400 vertically is set according to an operation of the player, or is set automatically by detecting a direction of the information processing apparatus 10 based on an output of an acceleration sensor or a gyro sensor as described later.

In addition, it is also possible to hold the information processing apparatus 10 vertically to display the browser screen 400 vertically, while turning the second operation stick 18b up.

Thus, since the information 404 and the operation buttons 406 are displayed near or around the first operation stick 18a and the second operation stick 18b in the browser screen 400, the content is not disturbed. Furthermore, since the operation buttons 406 are provided (displayed) around the second operation stick 18b and thus means to perform an operation concerning the browser or content is gathered in one place, it is easy to operate it.

Figure 18:
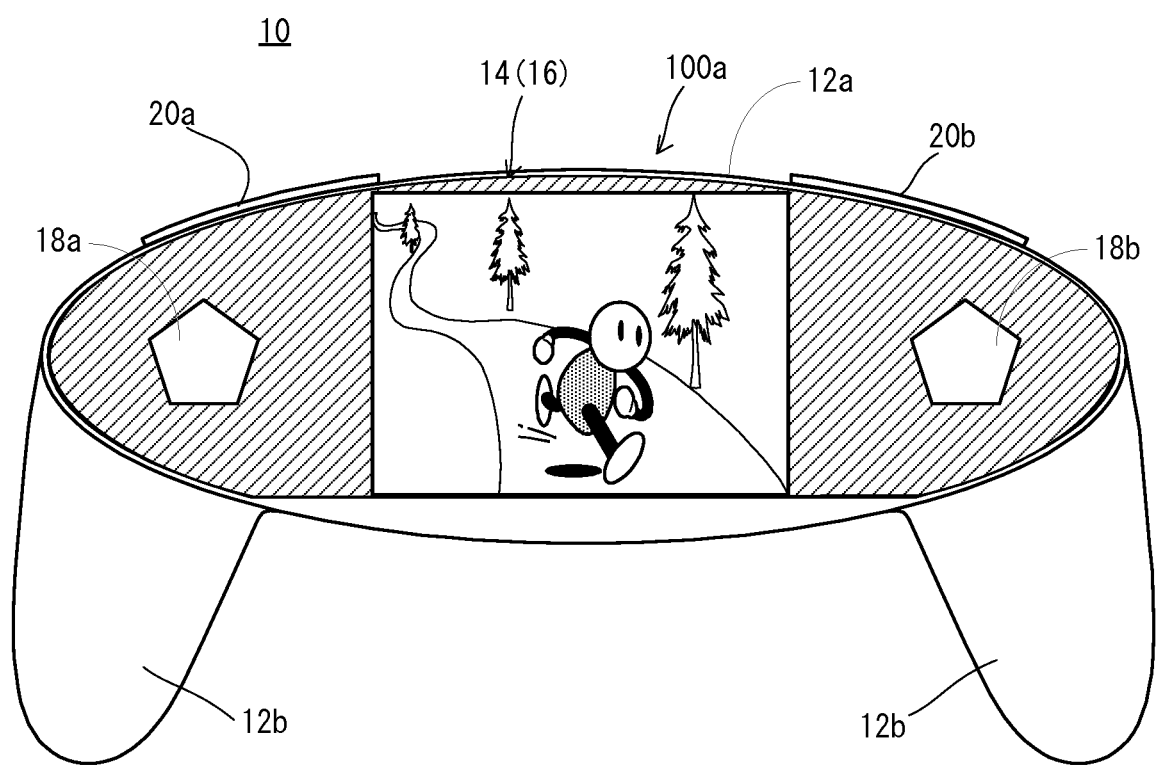
FIG. 18 is an illustration view showing a non-limiting example game screen of a game of an old version.

FIG. 18 shows a further example of a game screen 100a. The game screen 100a shown in FIG. 18 is displayed between the first operation stick 18a and the second operation stick 18b. For example, a game of the game screen 100a shown in FIG. 18 is a game of an old version of the above-mentioned game, and a size of a screen is not equivalent to a size of the display panel 14 of the information processing apparatus 10. Furthermore, because of the game of an old version, a screen design is not created supposing the hole 32 or the notch 34 formed in the display panel 14. For example, the image data of the game screen 100a is generated for a display panel of an aspect ratio of 4:3.

In addition, in FIG. 18, slant lines are applied to an area that no image is displayed in the display panel 14. In fact, this shadow area becomes black.

That is, in the information processing apparatus 10, a displaying method of a screen can be changed corresponding to a kind of an application such as an aspect ratio of a screen generated by the application to be performed, a version of an application to be performed, etc. Although the game of different version is described here, it is possible to arbitrarily change the displaying method of the screen corresponding to arbitrary applications.

Figure 19:
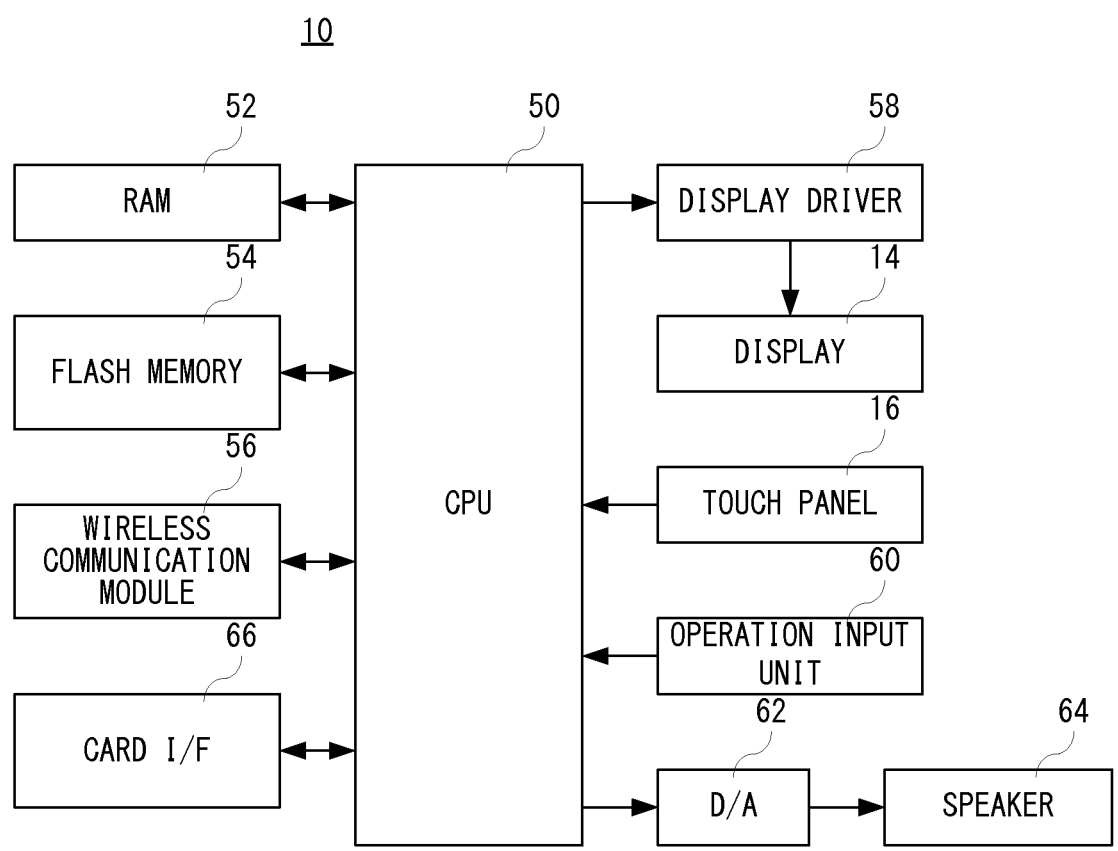
FIG. 19 is a block diagram showing non-limiting example electric structure of the information processing apparatus.

FIG. 19 is a block diagram showing electric structure of the information processing apparatus 10 shown in FIG. 1. As shown in FIG. 19, the information processing apparatus 10 includes the CPU 50, and the CPU 50 is connected with the above-mentioned touch panel 16, and further connected with a RAM 52, a flash memory 54, a wireless communication module 56, a display driver 58, an operation input unit 60, a D/A converter 62 and a card interface (card I/F) 66. The above-mentioned display panel 14 is connected to the display driver 58, and a speaker 64 is connected to the D/A converter 62. The operation input unit 60 is constituted by the first operation stick 18a, the second operation stick 18b, the first operation button 20a and the second operation button 20b all mentioned above.

The touch panel 16 inputs the touch coordinate data corresponding to a touch position into the CPU 50 in response to the touch input by the player. Furthermore, the operation input unit 60 inputs operation data into the CPU 50 corresponding to an operation of the player. In this embodiment, the operation data includes at least one of the direction input data from the operation stick (18a, 18b), the depression data from the operation sticks (18a, 18b) and the depression data from the operation button (20a, 20b). The CPU 50 stores into the RAM 52 the operation data that is input from the operation input unit 60 according to a time series, and uses it for the processing (information processing) of applications such as a game. In addition, strictly, the depression data based on depression of the operation sticks (18a, 18b) is input into the CPU 50 from the tact switch 1240.

The CPU 50 is in charge of the entire control of the information processing apparatus 10. The RAM 52 is used as a working memory and a buffer memory for the CPU 50. The flash memory 54 is used in order to store a program of an application such as a game or to store (save) various kinds of data.

The wireless communication module 56 has a function to connect a wireless LAN. Therefore, the information processing apparatus 10 can communicate with computer(s) or other information processing apparatus(es) 10 directly or via a network. Therefore, it is possible to transmit and receive programs and data to or from other computer(s) or other information processing apparatus(es) 10. For example, the program and data of the application such as a game are distributed from other computer(s). Furthermore, it is possible to play a communication game with other computer(s) or other information processing apparatus(es) 10.

Under instructions of the CPU 50, the display driver 58 is used for displaying various screens such as the game screen 100 and the character input screen 200 on the display panel 14. In addition, the CPU 50 uses a part of the RAM 52 as a video RAM (VRAM) to generate the image data corresponding to various screens.

The D/A converter 62 converts sound data applied from the CPU 50 into an analog game sound to output to the speaker 64. In addition, the game sound means a sound required for the game such as an imitation sound of a game character or object, a sound effect and music (BGM).

Furthermore, the CPU 50 is electrically connected to the card storage medium that is attached to the card slot 40 of the information processing apparatus 10 via the card I/F 66, and reads a program and data from the card storage medium or writes a program and data in the card storage medium.

In addition, the electric structure of the information processing apparatus 10 shown in FIG. 19 is a mere example, and does not need to be limited to this.

For example, the information processing apparatus 10 may be provided with at least one of an acceleration sensor and a gyro sensor. For example, the acceleration sensor is an acceleration sensor of an electrostatic capacitance type, and detects each acceleration of each of a right-and-left axis direction, up-and-down axis direction and thickness axis direction of the information processing apparatus 10. However, the acceleration sensor may be a 2-axis acceleration sensor. Furthermore, the gyro sensor is a gyro sensor of a piezoelectric vibration type, and detects angular velocities about a right-and-left axis, up-and-down axis and thickness axis of the information processing apparatus 10. However, the gyro sensor may be a 2-axis gyro sensor.

In this case, the direction of the information processing apparatus 10 is detected based on an output of the acceleration sensor or the gyro sensor, and the direction of the screen to be displayed on the display panel 14 may be changed according to the direction of the information processing apparatus 10. In addition, the output of the acceleration sensor or the gyro sensor may be used as the instructions of the player. For example, the motion of the housing 12 may be detected according to the output of the acceleration sensor or the gyro sensor according to the direction that the player inclines the housing 12 or the direction that the player moves the housing 12 such that a moving direction of the moving object in the virtual space can be changed, or the direction of the virtual camera in the virtual space can be changed.

The information processing apparatus 10 may be provided with a vibrator. For example, the vibrator is a vibrating motor or a solenoid, and is provided in the inside of the housing 12, and applies the vibration to the housing 12. Therefore, the vibration is propagated to the fingers of the player holding the housing 12. Thus, by having the vibrator, the information processing apparatus 10 can generate vibration according to the operation input using the touch panel 16 or the operation input unit 60, or can generate vibration according to progress of a game, for example.

Figure 20:
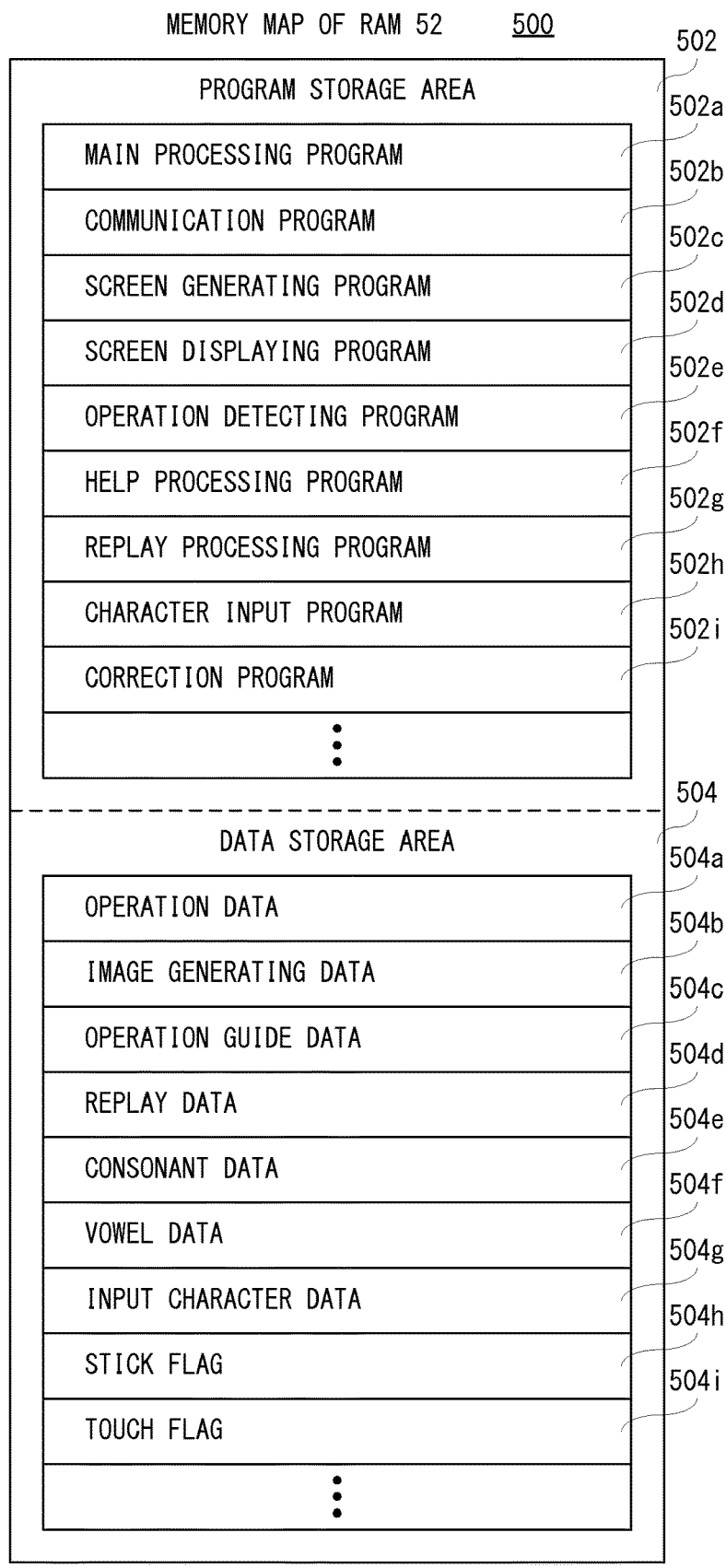
FIG. 20 is an illustration view showing a non-limiting example memory map of a RAM shown in FIG. 19.

FIG. 20 shows an example of a memory map 500 the RAM 52 shown in FIG. 19. As shown in FIG. 20, the RAM 52 includes a program storage area 502 and a data storage area 504.

As mentioned above, a part or whole of the program and the data described later can be acquired from other computer(s) or other information processing apparatus(es) 10 via the communication, or from the card storage medium that is attached to the information processing apparatus 10.

The program storage area 502 stores an application program (information processing program) such as a game program. In this embodiment, the game program is constituted by a main processing program 502a, a communication program 502b, a screen generating program 502c, a screen displaying program 502d, an operation detecting program 502e, a help processing program 502f, a replay processing program 502g, a character input program 502h, a correction program 502i, etc.

The main processing program 502a is a program for processing a main routine of the game of this embodiment. The communication program 502b is a program for communicating with other computer(s) and other information processing apparatus(es) 10. The screen generating program 502c is a program for generating image data corresponding to various screens such as the game screen 100, the character input screen 200 etc. using the image generating data 504b described later. The screen displaying program 502d is a program for outputting the image data produced according to the screen generating program 502c to the display panel 14.

The operation detecting program 502e is a program for detecting the operation data from the touch panel 16 and the operation input unit 60, and storing to the data storage area 504 according to a time series.

The help processing program 502f is a program for displaying the guide image (142, 144, and 146 in example shown in FIG. 13) about the operation input unit 60 on the screen like the game screen 100 using the operation guide data 504c described later. In addition, the help processing program 502f is executed at a predetermined timing like a case where the player selects the help mode (instructs to display the guide), a case where the game is started or a case where there is no operation by player beyond a predetermined time period, as mentioned above.

The replay processing program 502g is a program for performing game processing according to the replay data 504d described later. In addition, the replay processing program 502g displays the guide images (150, 152, 154 in example shown in FIG. 14) corresponding to the operation data included in the replay data 504d using the operation guide data 504c described later near or around the operation input unit 60 in the game screen 100 at a timing that the operation data is input. Furthermore, the replay processing program 502g is executed according to the operation of the player or a predetermined event in the game, as mentioned above.

The character input program 502h is a program for inputting a character by deciding a consonant and a vowel or deciding a punctuation. Although illustration is omitted, the data for displaying the input character is stored in the flash memory 54 of the information processing apparatus 10 in advance. Furthermore, the character input program 502h is executed according to the operation of the player or according to a predetermined character input event. The data (input character data) 504e corresponding to the input character or character string is stored into the data storage area 504 as described later.

The correction program 502i is a program for invalidating the direction input if the direction input from at least one of the first operation stick 18a and the second operation stick 18b is input in a case where the touch input from the touch panel 16 exists, and reversely, invalidating the touch input if the touch input from the touch panel 16 is input in a case where the direction input from at least one of the first operation stick 18a and the second operation stick 18b exists.

Although illustration is omitted, the game program includes a sound output program, a backup program, etc. The sound output program is a program for generating and outputting a sound required for a game. The backup program is a program for saving game data.

Furthermore, in the data storage area 504, operation data 504a, the image generating data 504b, the operation guide data 504c, the replay data 504d, the consonant data 504e, vowel data 504f and input character data 504g are stored.

The operation data 504a is operation data from the touch panel 16 and the operation input unit 60, and is stored according to a time series. The image generation data 504b is data of polygon data, texture data, etc. for generating the image data. The operation guide data 504c is image data about various kinds of guide images (142, 144, 146, 150, 152 and 154 in this embodiment). The replay data 504d is a history of the operation data at the time that the player or other player plays a game, and the operation data is stored with the absolute time after the game start.

The consonant data 504e is data about the consonant decided according to the character input program 502h. The vowel data 504f is data about the vowel decided according to the character input program 502h. The input character data 504g is data about a character or character string decided according to the character input program 502h.

Furthermore, a stick flag 504h and a touch flag 504i are provided in the data storage area 504.

The stick flag 504h is a flag for distinguishing whether the key top portion 1800 and the shaft portion 1802 of the first operation stick 18a or the second operation stick 18b are tilted, and consists of a 1-bit register. When the key top portion 1800 and the shaft portion 1802 of the first operation stick 18a or the second operation stick 18b are tilted, the stick flag 504h is turned on and "1" is set to the register. On the other hand, when the key top portion 1800 and the shaft portion 1802 of the first operation stick 18a and the second operation stick 18b are not tilted, the stick flag 504h is turned off and "0" is set to the register.

The touch flag 504i is a flag for distinguishing whether the touch input is performed in the touch panel 16, and consists of a 1-bit register. When the touch input is performed to the touch panel 16, the touch flag 504i is turned on and "1" is set to the register. On the other hand, when the touch input is not performed to the touch panel 16, the touch flag 504i is turned off and "0" is set to the register.

Although illustration is omitted, the data storage area 504 is stored with other data required for execution of the game program, and provided with other flags and counters (timers) for execution of the game program.

Figure 21:
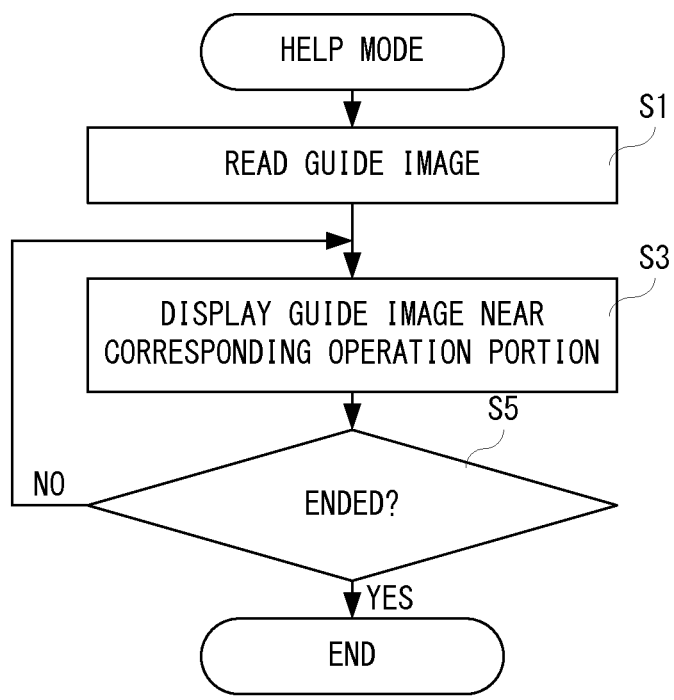
FIG. 21 is a flowchart showing non-limiting example help processing of a CPU shown in FIG. 19.

FIG. 21 is a flowchart showing processing (help processing) in the help mode of the CPU 50 shown in FIG. 19. As mentioned above, the CPU 50 starts the help processing at a predetermined timing when the player selects the help mode (instructs to display the guide), when the game is started or when there is no operation by the player beyond a predetermined time period, and the guide image is read in a step S1 as shown in FIG. 21. Here, the data of the guide image (the operation method may be included) of the contents of the operation assigned to each of the first operation stick 18a, the second operation stick 18b, the first operation button 20a and the second operation button 20b is read from the operation guide data 504c.

In a next step S3, the guide image that is read in the step S1 is displayed near the corresponding operation input unit 60. Therefore, the game screen 100 as shown in FIG. 12 is displayed on the display panel 14.

Then, it is determined, in a step S5, whether the help mode is to be ended. Here, the CPU 50 determines whether the end of the help mode is instructed from the player or a timing that the help mode is to be ended is reached. If "NO" is determined in the step S5, that is, the help mode is not to be ended, the process returns to the step S3 with no operation. On the other hand, if "YES" is determined in the step S5, that is, if it is the end of the help mode, the help processing is terminated.

Figure 22:
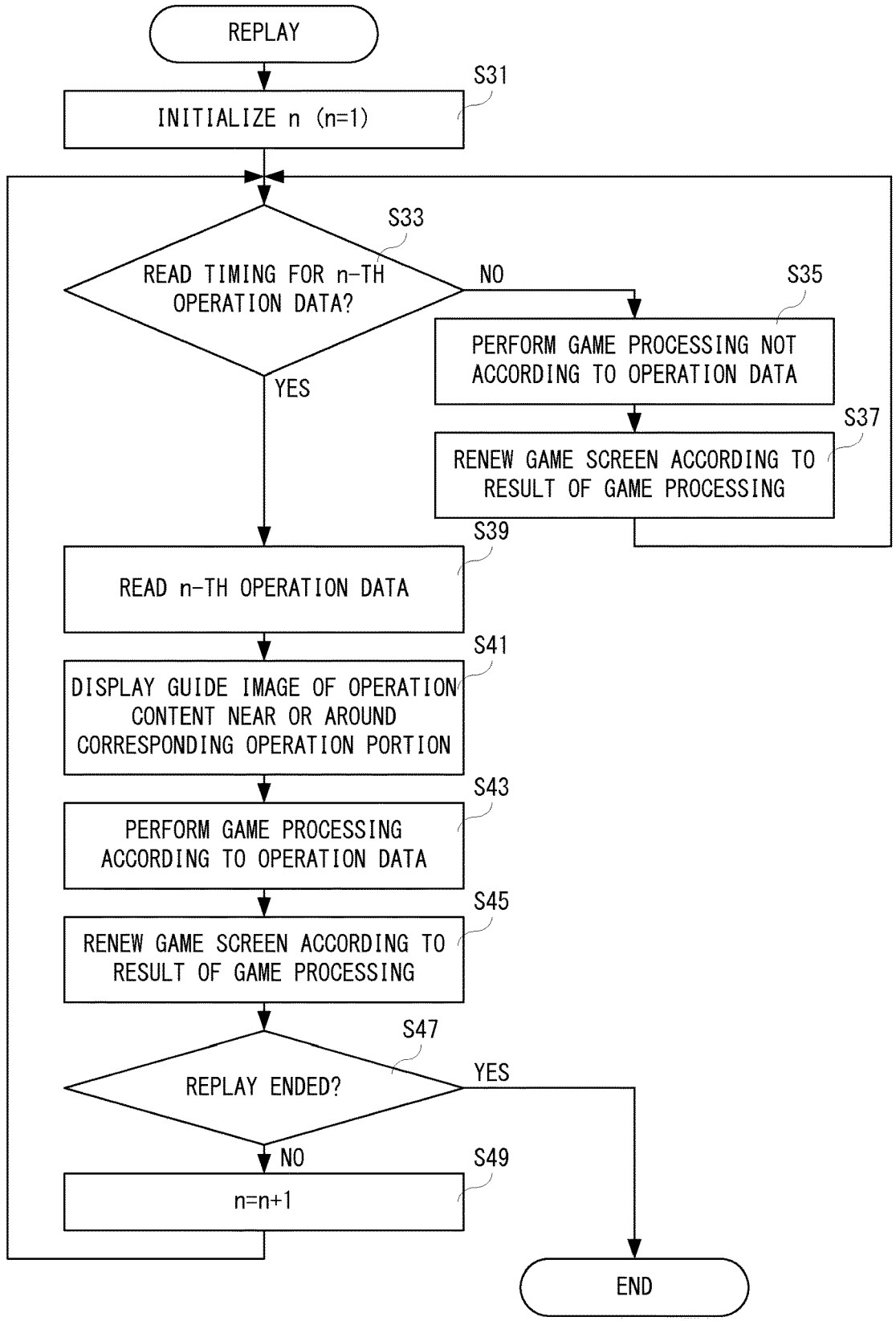
FIG. 22 is a flowchart showing a non-limiting example replay processing of the CPU shown in FIG. 19.

FIG. 22 is a flowchart showing replay processing of the CPU 50 shown in FIG. 19. As mentioned above, the CPU 50 starts the replay processing according to the operation of the player, or according to the predetermined event during the game, and initializes a variable n (n=1) in a step S31. The variable n is used in order to read the operation data according to a time series.

In a next step S33, it is determined, with reference to the replay data 504d, whether it is the read timing of the n-th operation data. That is, the CPU 50 determines whether the absolute time after starting the replay processing reaches the absolute time that is stored corresponding to the n-th operation data.

If "NO" is determined in the step S33, that is, if it is not the read timing of the n-th operation data, in a step S35, the game processing not according to the operation data, and in a step S37, the game screen 100 (image data) is renewed according to a result of the game processing, and the process returns to the step S33. For example, in the step S35, the CPU 50 moves a non-player character like the enemy character 106 that performs an arbitrary action such as movement irrespective of the operation of the player, or changes a background image (background object).

On the other hand, if "YES" is determined in the step S33, that is, if it is the read timing of the n-th operation data, the n-th operation data is read in a step S39, the guide image (operation method may be included) of the contents of the operation corresponding to read operation data is displayed near or around the operation input unit 60 (18a, 18b, 20a, 20b) in a step S41. Here, the CPU 50 reads the data of the guide image from the operation guide data 504c.

In a next step S43, the game processing according to the read operation data is performed. Here, the CPU 50 makes the player character 102 perform arbitrary action or fight against the enemy character 106 according to the operation data, for example. Furthermore, the game screen 100 (image data) is renewed according to the result of the game processing, in a step S45.

Then, it is determined, in a step S47, whether the replay is to be ended. Here, the CPU 50 determines whether the play image is replayed from the start to the end of the game according to the replay data 504d. If "NO" is determined in the step S47, that is, if it is not the end of the replay, the variable n is incremented by 1 (one) (n=n+1) in a step S49, and the process returns to the step S33. On the other hand, if "YES" is determined in the step S47, that is, if it is the end of the replay, the replay processing is terminated.

Figure 23:
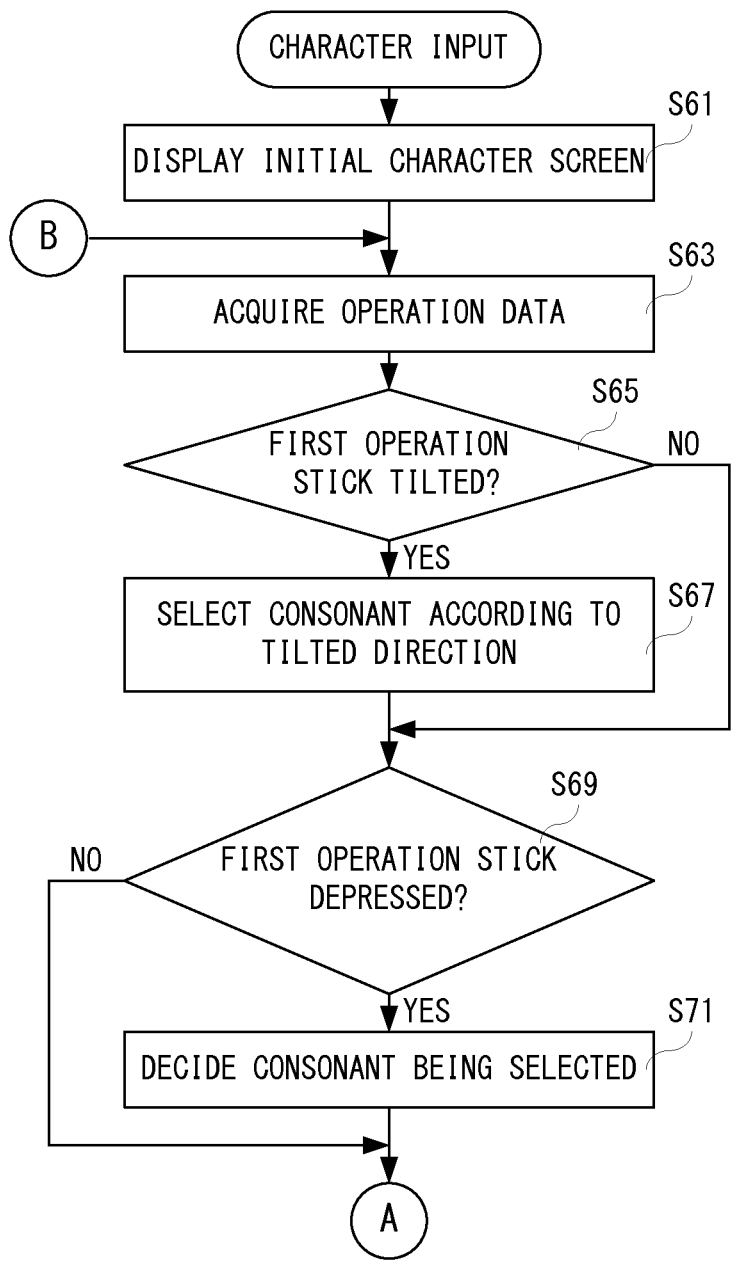
FIG. 23 is a flowchart showing a part of non-limiting example character input processing of the CPU shown in FIG. 19.
Figure 24:
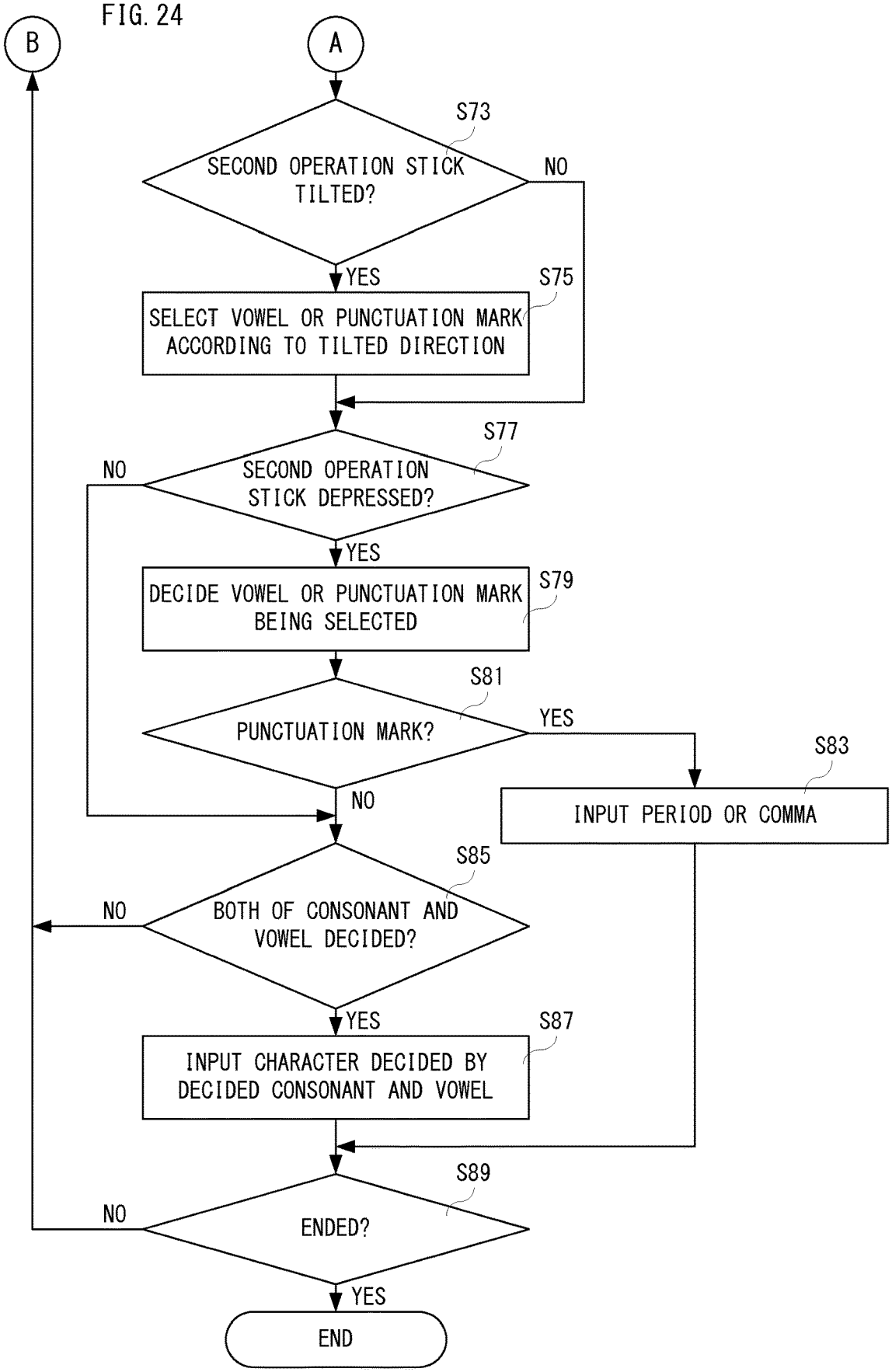
FIG. 24 is a flowchart showing another part of the non-limiting example character input processing of the CPU shown in FIG. 19, following FIG. 23.

FIG. 23 and FIG. 24 are flowcharts showing character input processing of the CPU 50 shown in FIG. 19. As mentioned above, if the character input processing is started according to the operation of the player or according to a predetermined character input event, the CPU 50 displays an initial character input screen 200 on the display panel 14 in a step S61. Here, the CPU 50 uses a part of the RAM 52 as the VRAM, and generates the image data of the initial screen of the character input screen 200 as shown in FIG. 15 using the image generating data 504b and the operation guide data 504c to display (output) on the display panel 14 via the display driver 58. Although illustration is omitted, when the character input processing is started, the consonant data 504e and the vowel data 504f are deleted.

In a next step S63, the operation data is acquired. Here, the CPU 50 detects the operation data that is input from the touch panel 16 and the operation input unit 60 (18a, 18b, 20a, 20b), and stores the same into the data storage area 504.

In a next step S65, it is determines whether there is any tilting of the first operation stick 18a. That is, the CPU 50 determines whether the direction input data of the first operation stick 18a is detected. This is true for a step S73 described later. If "NO" is determined in the step S65, that is, if there is no tilting of the first operation stick 18a, the process proceeds to a step S69 with no operation. On the other hand, if "YES" is determined in the step S65, that is, if there is the tilting of the first operation stick 18a, a consonant is selected according to the tilted direction in a step S67, and the process proceeds to a step S69. In addition, in the step S67, when a consonant is selected, the CPU 50 notifies to the player that the consonant is selected by heightening brightness or changing a color of the consonant being selected or display area thereof. This is true for a step S75 described later.

In the step S69, it is determined whether there is any depression of the first operation stick 18a. That is, the CPU 50 determines whether the depression data of the first operation stick 18a is detected. This is true for a step S77 described later. If "NO" is determined in the step S69, that is, if the depression data of the first operation stick 18a is not detected, the process proceeds to a step S73 shown in FIG. 24 with no operation. On the other hand, if "YES" is determined in the step S69, that is, if the depression data of the first operation stick 18a is detected, the consonant being selected is decided as a consonant of the character to be input in a step S71, and the process proceeds to a step S73.

That is, in the step S71, the CPU 50 stores the consonant data 504e corresponding to the decided consonant into the data storage area 504.

As shown in FIG. 24, it is determined, in the step S73, whether there is any tilting of the second operation stick 18b. If "NO" is determined in the step S73, that is, if there is no tilting of the second operation stick 18b, the process proceeds to a step S77 with no operation. On the other hand, if "YES" is determined in the step S73, that is, if there is the tilting of the second operation stick 18b, a vowel or punctuation is selected according to the tilted direction in the step S75.

In the step S77, it is determined whether there is any depression of the second operation stick 18b. If "NO" is determined in the step S77, that is, if there is no depression of the second operation stick 18b, the process proceeds to a step S83 with no operation. On the other hand, if "YES" is determined in the step S77, that is, if there is the depression of the second operation stick 18b, it is determines, in a step S79, whether a vowel or a punctuation being selected is decided as a vowel or a punctuation of a character to be input, and it is determined whether the punctuation is decided in a step S81. In addition, when the vowel is decided, the CPU 50 stores the vowel data 504f corresponding to the decided vowel into the data storage area 504 in the step S79.

If "YES" is determined in the step S81, that is, if the punctuation is decided, the decided period or comma is input in a step S83, and the process proceeds to a step S89. In the step S83, the CPU 50 adds the data of the decided period or comma to the input character data 504g. On the other hand, if "NO" is determined in the step S81, that is, if the vowel is decided, it is determined, in a step S85, whether both the consonant and the vowel are decided. Here, the CPU 50 determines whether both the consonant data 504e and the vowel data 504f are stored in the data storage area 504.

If "NO" is determined in the step S85, that is, if at least one of the consonant and the vowel is not decided, the process returns to the step S63 shown in FIG. 23. On the other hand, if "YES" is determined in the step S85, that is, if both the consonant and the vowel are decided is input, in a step S87, the character that is decided with the consonant and the vowel having been decided, and the process proceeds to the step S89. In addition, in the step S87, the CPU 50 adds the data corresponding to the decided character to the input character data 504g. Furthermore, although illustration is omitted, after performing the processing of the step S87, the consonant data 504e and the vowel data 504f are deleted.

In the step S89, it is determined whether it is the end of the character input. Here, the CPU 50 determines whether there is an end instruction of the character input from the player, or there is any end event of the character input. If "NO" is determined in the step S89, that is, if it is not the end of the character input, the process returns to the step S63. On the other hand, if "YES" is determined in the step S89, that is, if it is the end of the character input, the character input processing is terminated.

Figure 25:
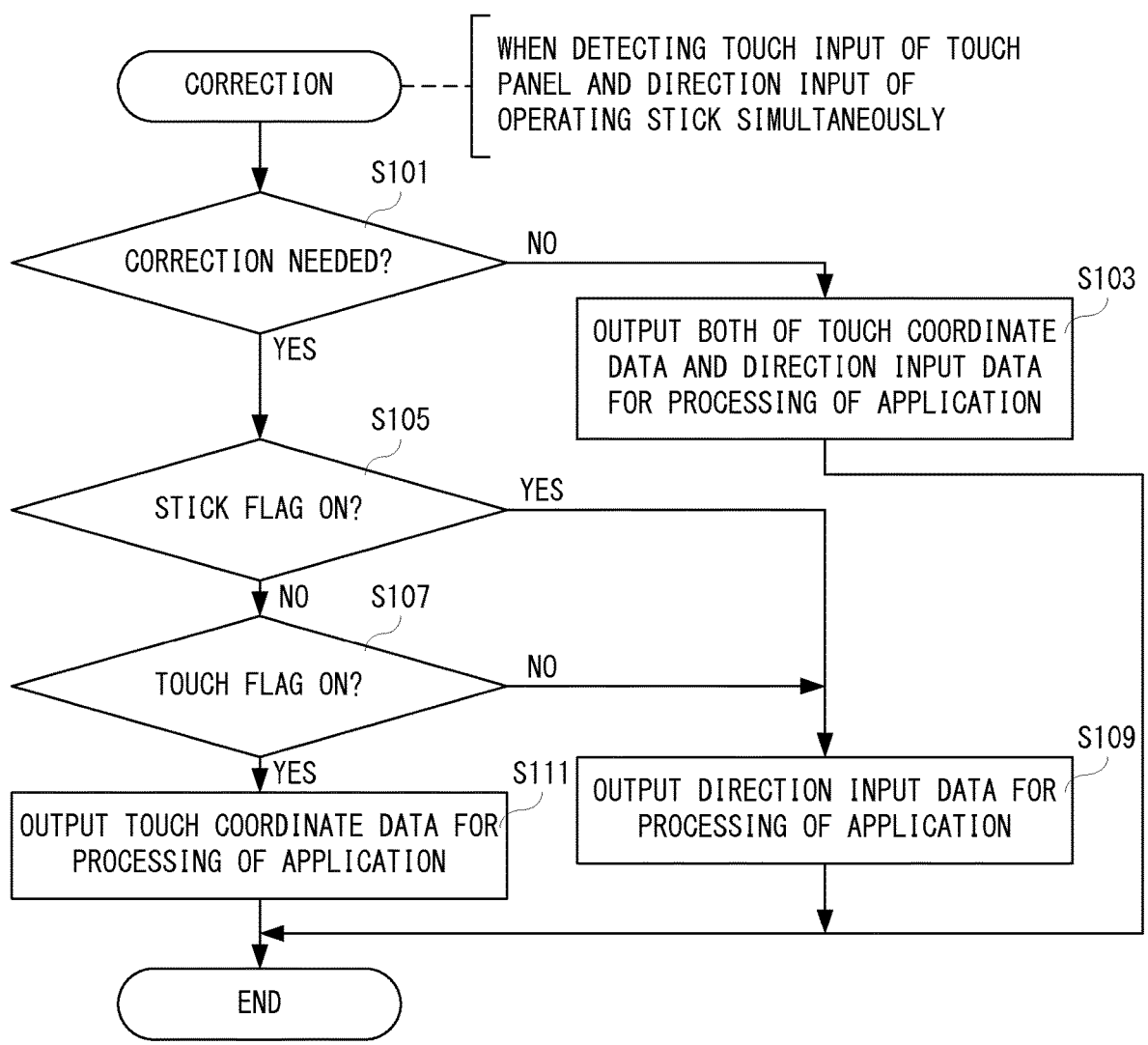
FIG. 25 is a flowchart showing a non-limiting example correction processing of the CPU shown in FIG. 19.

FIG. 25 is a flowchart showing correction processing of the CPU 50 shown in FIG. 19. This correction processing is performed when both the touch coordinate data of the touch panel 16 and the direction input data of the operation stick (18a, 18b) are detected simultaneously. In addition, although illustration is omitted, separately from this correction processing, processing that turns on or off the stick flag 504h according to the presence or absence of the tilting of the operation stick (18a, 18b) is performed. Similarly, processing that turns on or off the touch flag 504i according to the presence or absence of the touch input to the touch panel 16 is also performed.

As shown in FIG. 25, the CPU 50 starts the correction processing if the touch input and the direction input are simultaneously detected, and determines, in a step S101, whether it is necessary to perform the correction. That is, the CPU 50 determines whether the game processing is to be performed according to the touch coordinate data or the direction input data.

If "NO" is determined in the step S101, that is, if there is no necessity for correction, in a step S103, both the touch coordinate data and the direction input data are output to the processing of the application (game), and the correction processing is terminated. On the other hand, if "YES" is determined in the step S101, that is, if there is necessity for correction, it is determined, in a step S105, whether the stick flag 504h is on.

If "YES" is determined in the step S105, that is, if the stick flag 504h is on, it is determined that the touch input is performed to the touch panel 16 in a state where the operation stick (18a, 18b) is tilted, and in a step S109, the direction input data is output to the processing of the application, and the correction processing is terminated. That is, the touch coordinate data is deleted in a step S109.

On the other hand, if "NO" is determined in the step S105, that is, if the stick flag 504h is off, it is determined, in a step S107, whether the touch flag 504i is on. If "NO" is determined in the step S107, that is, if the touch flag 504i is off, the process proceeds to a step S109. On the other hand, if "YES" is determined in the step S107, that is, if the touch flag 504i is on, in a step S111, the touch coordinate data is output to the processing of the application, and the correction processing is terminated. That is, the direction input data is deleted in a step S111.

In addition, in this embodiment, when the direction input and the touch input are performed simultaneously from a state there are no direction input by means of the operation stick (18a, 18b) and no touch input by means of the touch panel 16, the priority is given to the direction input. However, if the priority is to be given to the touch input, when "NO" is determined in the step S105, the process should just proceed to the step S111 without performing determination processing in the step S107.

According to this embodiment, since the hole is opened in the display panel and the touch panel and the operation stick is embedded therein, it is possible to enlarge the display surface without enlarging the information processing apparatus.

In addition, although a form of the first portion is made into an elliptical form when viewing from the front in this embodiment, it does not need to be limited to this. For example, the first portion is made in a track form, oval form or square form when viewing from the front, or a form approximating to them. When the first portion is made into the track form or the oval form when viewing from the front, the both end portions of the first portion are made into the form of a semi-circle or approximately semi-circle.

In addition, although two operation sticks are provided in this embodiment, the number of the operation sticks may be one.

Furthermore, although the operation stick that a direction input and a depression input are possible is embedded in the display panel and the touch panel in this embodiment, other input means may be made to be embedded. For example, a cross button that a direction input is possible may be embedded, a push button that a depression input is possible may be embedded or both the cross button and the push button may be embedded. In addition, the cross button and the push button may be embedded instead of the operation stick or may be embedded together with the operation stick.

Furthermore, in this embodiment, although the operation stick designates a direction by tilting the key top portion and the shaft portion, they do not need to be limited to this. By making the key top portion approximately parallel to the surface of the display panel, and by sliding the key top in an arbitrary direction, a direction can be designated.

In addition, although a tact switch is provided to detect the depression of the operation stick in this embodiment, it does not need to be limited to this. For example, an operation stick that has a detection portion capable of detecting not only that the key top portion and the shaft portion are tilted but also that the operating stick is depressed may be provided. In such a case, the operation stick is fixed to the inside of the housing such that the detection portion itself is not displaced.

Furthermore, the detection portion included in the operation stick is not limited to the structure of the above-mentioned embodiment. For example, the detection portion may be a fixed contact that is provided on the bottom of the depressible button to detect that the button is depressed, and further can include all device or member provided within the housing to detect a predetermined operation against the operation portion by the player.

Furthermore, although the hole is opened in the display panel and the touch panel, and the operation stick is embedded in them in this embodiment, it does not need to be limited to this. For example, by cutting off a portion hidden by the thumb when holding the information processing apparatus (housing), and the operation stick may be embedded in the portion.

In addition, in this embodiment, although the touch panel is provided on the display panel, it does not need to be limited to this. The touch panel should just be provided so as to detect the touch input (touch operation) to the display panel. Therefore, the touch panel may be provided in the rear side of the housing, for example. Furthermore, if adopting structure that can transmit the touch coordinate data to a CPU, the touch panel may be provided separately from the housing.

Furthermore, although the touch panel is provided in this embodiment, it is not necessary to provide the touch panel. In such a case, an operation can be performed with the operation stick and the operation button.

Furthermore, although this embodiment is described about the information processing apparatus comprising the display panel and the touch panel, it is possible to also make an information processing apparatus function as an input device such as a controller by not providing the display panel.

Furthermore, although all the information processing such as a game processing is performed in the information processing apparatus in this embodiment, only a part of the information processing may be performed. For example, the information processing apparatus may perform processing that receives and outputs the image data (picture image data) and sound data that are transmitted from other information processing apparatuses such as a computer or a game apparatus, or processing that outputs (transmits) the operation input from the operation stick, the operation button and the touch panel to other information processing apparatuses, or both the processing.

Furthermore, although the housing is constituted by the first portion and the grip portions in this embodiment, there may not be any grip portion.

Furthermore, although a case where the help processing, the replay (reproduction) processing, the character input processing and the correction processing can be performed during the game of the embodiment is described in this embodiment, it is not necessary to make all of these processing (functions) be performed during the game, only one or two or more thereof may be performed.

As mentioned above, the display panel is formed in approximately elliptical form in a certain aspect of this embodiment. In this case, for example, the first rim portion along at least the arc portion of the display panel is formed.

Furthermore, in a further aspect of this embodiment, the both right and left end portions of the display panel are formed in a form of approximately semi-circle.

Furthermore, the display panel is formed in approximately track form in a further aspect of this embodiment.

Furthermore, in a further aspect of this embodiment, the first operation unit has an operation portion and a detection portion, and the size of the operation portion of this first operation unit is made larger than the hole for penetrating the display panel.

Furthermore, as mentioned above, in a further aspect of this embodiment, the object is displayed near the operation portion, and is the guide display corresponding to the operation portion. For example, the image (text image is included) that indicates the operation content (the content of instructions), the operation method, etc. of the operation portion is displayed.

Furthermore, in a further aspect of this embodiment, the information processing apparatus further comprises the second operation unit having the second operation portion located on the surface of the housing that is different from the surface that the display panel is provided. The objects are respectively displayed near the first operation portion that is the operation portion of the first operation unit and the second operation portion that is the operation portion of the second operation unit, and are the guide displays corresponding to the first operation portion and the second operation portion. For example, the images (text image is included) that indicate the operation content (the content of instructions), the operation method, etc. of the first operation portion and the second operation portion are displayed.

Furthermore, in a further aspect of this embodiment, the object can be selected by the direction input of the operation portion. For example, the object that is displayed in the direction being pointed is selected.

In a further aspect of this embodiment, the information processing apparatus further comprises the touch panel that can detect the touch input to the display panel. A first operation determining module is configured to determine whether the operation portion is currently operated. A touch input invalidating module is configured to invalidate the touch input from the touch panel when it is determined by the first operation determining module that the operation portion is currently operated.

In a further aspect of this embodiment, the information processing apparatus further comprises the touch panel that can detect the touch input to the display panel. A first operation determining module is configured to determine whether the operation portion is currently operated. A touch input invalidating module is configured to invalidate the touch input within the predetermined range of the circumference of the operation portion if the touch input from the touch panel exists when it is determined by the first operation determining module that the operation portion is currently operated.

In a further aspect of this embodiment, the information processing apparatus further comprises the touch panel that can detect the touch input to the display panel. A touch input determining module is configured to determine whether the touch input is currently performed in the touch panel. A first operation invalidating module is configured to invalidate the operation input from the first operation unit when it is determined by the touch input determining module that the touch input is currently performed.

In a certain aspect of this embodiment, the information processing apparatus comprises the housing having the display panel, the operation unit having the operation portion and the detection portion, and the display control module configured to display a virtual space on the display panel, wherein the operation unit is provided in a manner that the detection portion is located in the housing and the operation portion penetrates the display panel to be exposed outside the housing. For example, the display control module is configured to operate the object in the virtual space corresponding to the operation input from the operation unit.

In a further aspect of this embodiment, the information processing apparatus comprises the housing having the touch panel, and the first operation unit having the operation portion and the detection portion wherein the first operation unit is provided in a manner that the detection portion is located in the housing and the operation portion penetrates the touch panel to be exposed outside the housing.

In a further aspect of this embodiment, the information processing apparatus comprises the housing having the touch panel, and the first operation unit that is provided in a hole formed in the touch panel.

In a further aspect of this embodiment, the information processing apparatus comprises the housing having the display panel that is formed with a hole or notch, and the operation unit having the operation portion and the detection portion, wherein the operation unit is provided in a manner that the operation portion is exposed outside the housing from the hole or notch of the display panel.

In a further aspect of this embodiment, the information processing apparatus comprises the display panel, and the operation unit having the operation portion and the detection portion, wherein the operation unit is provided in a manner that the detection portion is located inside the information processing apparatus and the operation portion penetrates the display panel to be exposed outside the information processing apparatus.

In a further aspect of this embodiment, the information processing apparatus comprises the housing having the display panel, and the operation unit that is provided to be projected from the rear side to the front side of the display panel.

In a further aspect of this embodiment, the information processing apparatus comprises the housing having the display panel, and the operation unit embedded in the display panel.

Although certain example systems, devices and apparatuses have been described herein, it is to be understood that the appended claims are not to be limited to the systems, devices and apparatuses disclosed, but on the contrary, are intended to cover various modifications and equivalent arrangements included within the spirit and scope of the appended claims.

The invention claimed is:
1. A game apparatus, comprising:
  a housing having a display panel that displays at least a virtual game space;
  a first operation unit having a first operation portion and a first detection portion; and
  a second operation unit having a second operation portion and a second detection portion, wherein
  the first operation unit penetrates the display panel,
  the second operation unit penetrates the display panel,
  the first detection portion and the second detection portion are located inside the housing,
  the first operation portion and the second operation portion are exposed outside the housing,
  at least part of the first operation portion is positioned above and spaced from the display panel to hide a part of a game image appearing in the virtual game space,
  the first operation portion and the second operation portion are not in the discriminable visual field and are not in the effective visual field of a user when the user holds the game apparatus at a predetermined distance from the user's eyes with the center of the display panel visible at the center of the discriminable visual field and the effective visual field of the user,
  the first operation portion and the second operation portion are configured to direct movement of a game object within the discriminable visual field of the virtual game space when the user holds the game apparatus, and
  the game apparatus is a hand-held type.
2. The game apparatus according to claim 1, wherein the first operation portion of the first operation unit is provided in a range that a thumb of a user is placed when holding the housing.
3. The game apparatus of claim 1, further comprising first and second hand grip portions extending from a lower side of the housing and substantially aligned with the first and second operation units, respectively, each of the first and second hand grip portions being configured to be held by the user's palm.
4. The game apparatus of claim 1, wherein a key top portion of the first operation portion has a width greater than a shaft portion of the first operation portion to thus hide the part of the game image under the key top portion, the first operation portion being in the form of a tiltable joystick.
5. The game apparatus of claim 1, wherein, as seen from front view of the display panel, the object appears to contact the first operation portion such that the object forms a continuous and uninterrupted extension of the first operation portion.
6. The game apparatus of claim 1, wherein pixel elements that correspond to the hidden part of the game image appearing in the virtual game space are activated during gameplay and are hidden by the part of the first operation portion that is positioned above and spaced from the display panel.
7. The game apparatus of claim 1, wherein the game image is a background image that is configured to appear in the discriminable field adjacent the game object, and to dynamically move to a position underneath and hidden by the first operation portion.
8. An information processing apparatus, comprising:
  a housing having a display panel; and
  a first operation unit having a first operation portion and a first detection portion;
  a second operation unit having a second operation portion and a second detection portion, wherein
  the first operation unit penetrates the display panel,
  the second operation unit penetrates the display panel, the first detection portion and the second detection portion are located inside the housing, at least part of the first operation portion is positioned above and spaced from the display panel to hide a part of a game image appearing in a virtual game space, the first operation portion and the second operation portion are exposed outside the housing, the first operation portion and the second operation portion are not in the discriminable visual field and are not in the effective visual field of a user when the user holds the information processing apparatus at a predetermined distance from the user's eyes with the center of the display panel visible at the center of the discriminable visual field and the effective visual field of the user, the first operation portion and the second operation portion are configured to direct movement of a game object within the discriminable visual field of the virtual game space when the user holds the game apparatus, and the information processing apparatus is a hand-held type.

9. The information processing apparatus according to claim 8, wherein the display panel has a hole through which the first operation unit penetrates, the first operation portion being dimensioned to hide the hole.

10. The information processing apparatus according to claim 9, further comprising a generating module configured to generate image data corresponding to a display screen to be displayed on the display panel, wherein the generating module generates the image data irrespective of the presence of the hole.

11. The information processing apparatus according to claim 8, wherein the first operation portion is partially provided above the display panel in a thickness direction of the housing, and the first detection portion is provided below the display panel, said thickness direction being perpendicular to a display surface of the display panel.

12. The information processing apparatus according to claim 8, wherein the display panel is an oblong form.

13. The information processing apparatus according to claim 12, wherein the display panel is approximately elliptical form, further comprising a first rim portion along at least an arc portion of the display panel.

14. The information processing apparatus according to claim 12, further comprising a third rim portion close to one long side of the display panel, the third rim portion being larger than a second rim portion along the other long side of the display panel.

15. The information processing apparatus according to claim 12, further comprising a fourth rim portion that is formed along one long side of the display panel.

16. The information processing apparatus according to claim 8, wherein each of left and right end portions of the display panel is a form of an arc.

17. The information processing apparatus according to claim 8, wherein a size of a front surface of the housing approximately corresponds to a size of the display panel, and the display panel constitutes the front surface of the housing.

18. The information processing apparatus according to claim 8, further comprising a touch panel capable of detecting a touch input to the display panel and a position in a display area of the display panel corresponding to the touch input.

19. The information processing apparatus according to claim 18, wherein the first operation unit also penetrates the touch panel and the first operation portion is exposed outside the housing.

20. The information processing apparatus according to claim 8, further comprising a third operation unit having an operation portion located on a surface of the housing different from the surface on which the display panel is provided.

21. The information processing apparatus according to claim 8, wherein the first operation unit is provided in the display panel apart from a center portion thereof.

22. The information processing apparatus according to claim 21, wherein
the first operation unit and the second operation unit are provided in a left side area and a right side area of the display panel, respectively.

23. The information processing apparatus according to claim 22, wherein the first operation unit and the second operation unit are provided in a left end portion and a right end portion of the display panel, respectively.

24. The information processing apparatus according to claim 8, wherein the first operation unit can perform a direction input by tilting or sliding the first operation portion.

25. The information processing apparatus according to claim 8, wherein the first operation unit can perform a depression input by pushing down the first operation portion.

26. The information processing apparatus according to claim 8, wherein the first operation unit can perform a direction input in 360 degrees.

27. The information processing apparatus according to claim 8, further comprising a virtual space display module configured to display on the display panel a virtual space image captured by a virtual camera.

28. The information processing apparatus according to claim 8, further comprising an initial screen display module configured to display an initial screen on the display panel according to an operation input by the first operation portion.

29. The information processing apparatus according to claim 8, further comprising an operation button display module configured to display a content in a center portion of the display panel, and to display an operation button concerning operating the content near or around the first operation portion on the display panel.

30. The information processing apparatus according to claim 8, further comprising a motion detection module configured to detect a motion of the housing.

31. The information processing apparatus according to claim 30, wherein the motion detection module includes at least one of an acceleration sensor and a gyro sensor.

32. The information processing apparatus according to claim 8, further comprising a vibrator configured to apply vibration to the housing.

33. The information processing apparatus according to claim 8, further comprising an object display module configured to display an object near the first operation portion.

34. The information processing apparatus according to claim 33, further comprising a touch panel capable of detecting a touch input to the object on the display panel.

35. The information processing apparatus according to claim 34, wherein the object is supplementally displayed near the first operation portion.

36. The information processing apparatus according to claim 33, wherein the object is a character, a figure or a sign or symbol and can be selected by a direction input of the first operation portion.

37. The information processing apparatus according to claim 33, wherein the object includes an operation history concerning the first operation portion.

38. The information processing apparatus according to claim 33, further comprising a third operation unit having a third operation portion located in a surface different from the surface on which the display panel is provided, wherein the object includes operation histories concerning the first operation portion and the third operation portion.

39. The information processing apparatus according to claim 33, wherein the object is an image effect.

40. The information processing apparatus according to claim 8, further comprising an object display module configured to display an object that fully surrounds the first operation portion.

41. The information processing apparatus according to claim 8, further comprising a screen display module configured to display a screen of an application on the display panel, wherein the screen display module changes a size of the screen to be displayed on the display panel according to a kind of the application or a kind of a screen used in the application.

42. The information processing apparatus according to claim 8, wherein
the first operation portion is provided in a range that a first thumb of a user is placed when holding the housing and the first thumb is outside of the discriminable visual field and the effective visual field of the user when the first thumb actuates the first operation unit, and
the second operation portion is provided in a range that a second thumb of the user is placed when holding the housing and the second thumb is outside of the discriminable visual field and the effective visual field of the user when the second thumb actuates the second operation unit.

43. The information processing apparatus of claim 8, further comprising first and second hand grip portions extending from a lower side of the housing and substantially aligned with the first and second operation units, respectively, each of the first and second hand grip portions being configured to be held by the user's palm.

44. The information processing apparatus of claim 8, wherein the display panel has a hole through which the first operation unit penetrates, the first operation portion having a dimension in a plane parallel to the display panel larger than a dimension of the hole that is co-planar with an upper surface of the display panel.

45. An information processing apparatus, comprising:
a housing having a display panel having a first hole and a second hole;
a first operation unit that is at least partially provided in the first hole; and
a second operation unit that is at least partially provided in the second hole,
wherein the first hole and the second hole are away from a center of the panel 15 degrees to the left, 15 degrees to the right, 8 degrees above, and 12 degrees below when the user holds the information processing apparatus in a predetermined orientation at a predetermined distance from the user's eyes with the center of the display panel visible at the center of the discriminable visual field and the effective visual field of the user,
the first operation unit and the second operation unit are configured to direct movement of a game object within the discriminable visual field of a virtual game space when the user holds the game apparatus, while the first and second operation units are positioned outside the discriminable visual field,
at least part of the first operation unit and at least part of the second operation unit are positioned above and spaced from the display panel to hide a part of a game image appearing in the virtual game space and the first and second holes, respectively, and
wherein the information processing apparatus is a hand-held type.

46. An information processing apparatus, comprising:
a housing having a display panel;
a first operation unit having a first operation portion and a first detection portion to detect an input by the first operation portion; and
a second operation unit having a second operation portion and a second detection portion to detect an input by the second operation portion, wherein
the first operation unit and the second operation unit are surrounded by the display panel,
the first detection portion and the second detection portion are located inside the housing,
the first operation portion and the second operation portion are exposed outside the housing,
the first operation portion and the second operation portion are at or proximate to peripheral edges of the display panel such that a user's hands obstruct a peripheral portion of a virtual space displayed on the display panel but do not obstruct a central portion of the virtual space when a user holds the information processing apparatus to use the first operation unit and the second operation unit,
the first operation portion and the second operation portion are configured to direct movement of a game object within a discriminable visual field of the virtual space when the user holds the apparatus,
at least part of the first operation portion is positioned above and spaced from the display panel to hide a part of a game image appearing in the virtual space, and
the information processing apparatus is a hand-held type.

47. The information processing apparatus according to claim 46, wherein the display panel has a hole or notch through which the first operation unit penetrates.

48. The information processing apparatus of claim 46, further comprising first and second hand grip portions extending from a lower side of the housing and substantially aligned with the first and second operation units, respectively, each of the first and second hand grip portions being configured to be held by the user's palm.

* * * * *